United States Patent
Ramasamy et al.

(10) Patent No.: US 11,424,789 B1
(45) Date of Patent: Aug. 23, 2022

(54) METHOD AND APPARATUS FOR MIMO ANTENNA SELECTION USING SPATIAL SWITCHED DIVERSITY FOR OPTIMAL COVERAGE AND BLOCKAGE MITIGATION

(71) Applicant: Dell Products, LP, Round Rock, TX (US)

(72) Inventors: Suresh K. Ramasamy, Cedar Park, TX (US); Lars Fredrik Proejts, Zhongshan District (TW)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/365,961

(22) Filed: Jul. 1, 2021

(51) Int. Cl.
| | | |
|---|---|---|
| *H04B 7/0413* | (2017.01) | |
| *H04B 7/08* | (2006.01) | |
| *H04B 7/06* | (2006.01) | |
| *H04B 17/318* | (2015.01) | |

(52) U.S. Cl.
CPC ......... *H04B 7/0413* (2013.01); *H04B 7/0691* (2013.01); *H04B 7/0874* (2013.01); *H04B 17/318* (2015.01)

(58) Field of Classification Search
CPC .............. H04W 84/12; H04B 17/318; H04B 7/0608; H04B 7/0602; H04B 7/0874; H04B 1/44; H04B 7/0413; H04B 7/0691; H04B 1/006
See application file for complete search history.

(56) References Cited

U.S. PATENT DOCUMENTS

| | | |
|---|---|---|
| 7,421,004 B2 | 9/2008 | Feher |
| 10,159,070 B2 | 12/2018 | Awoniyi-oteri |
| 10,420,023 B2 | 9/2019 | Ramasamy |
| 2018/0288731 A1 | 10/2018 | Akula |
| 2019/0140340 A1 | 5/2019 | Ramasamy |
| 2019/0140706 A1* | 5/2019 | Chang .................. H04B 7/0413 |
| 2020/0205062 A1 | 6/2020 | Azizi |

FOREIGN PATENT DOCUMENTS

| | | |
|---|---|---|
| EP | 1681772 A1 | 7/2006 |
| EP | 1681772 B1 | 8/2008 |
| EP | 3228013 A1 | 10/2017 |
| WO | 1997/008839 | 3/1997 |
| WO | 2018/064179 | 4/2018 |

\* cited by examiner

*Primary Examiner* — Rahel Guarino
(74) *Attorney, Agent, or Firm* — Prol Intellectual Property Law, PLLC; H. Kenneth Prol

(57) ABSTRACT

An information handling system may include a processor and a wireless interface adapter for communicating, via a plurality of transceiving antennas, wherein the plurality of transceiving antennas operate in an N×N multiple-in-multiple-out (MIMO) array configuration and an antenna controller to receive specific absorption rate (SAR) data from a plurality of SAR sensors, system operation and connection metrics, configuration data descriptive of a configuration of the information handling system. The antenna controller to execute an antenna selection algorithm to identify which among a plurality of transceiving antennas within the base chassis are to be used to operate in the N×N MIMO array configuration at a determined wireless protocol subsystem based on the spatial location of each of the antennas on the information handling system and the inputs of the SAR data, the system operation and connection metrics, and the configuration data by accessing a radio frequency (RF) switch.

20 Claims, 8 Drawing Sheets

METHOD AND APPARATUS FOR MIMO ANTENNA SELECTION USING SPATIAL SWITCHED DIVERSITY FOR OPTIMAL COVERAGE AND BLOCKAGE MITIGATION

FIELD OF THE DISCLOSURE

The present disclosure generally relates to transceiving WWAN, and WLAN data streams via a plurality of antennas in an information handling system. The present disclosure more specifically relates to selecting and switching among a plurality of transceiving antennas in an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, WiFi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
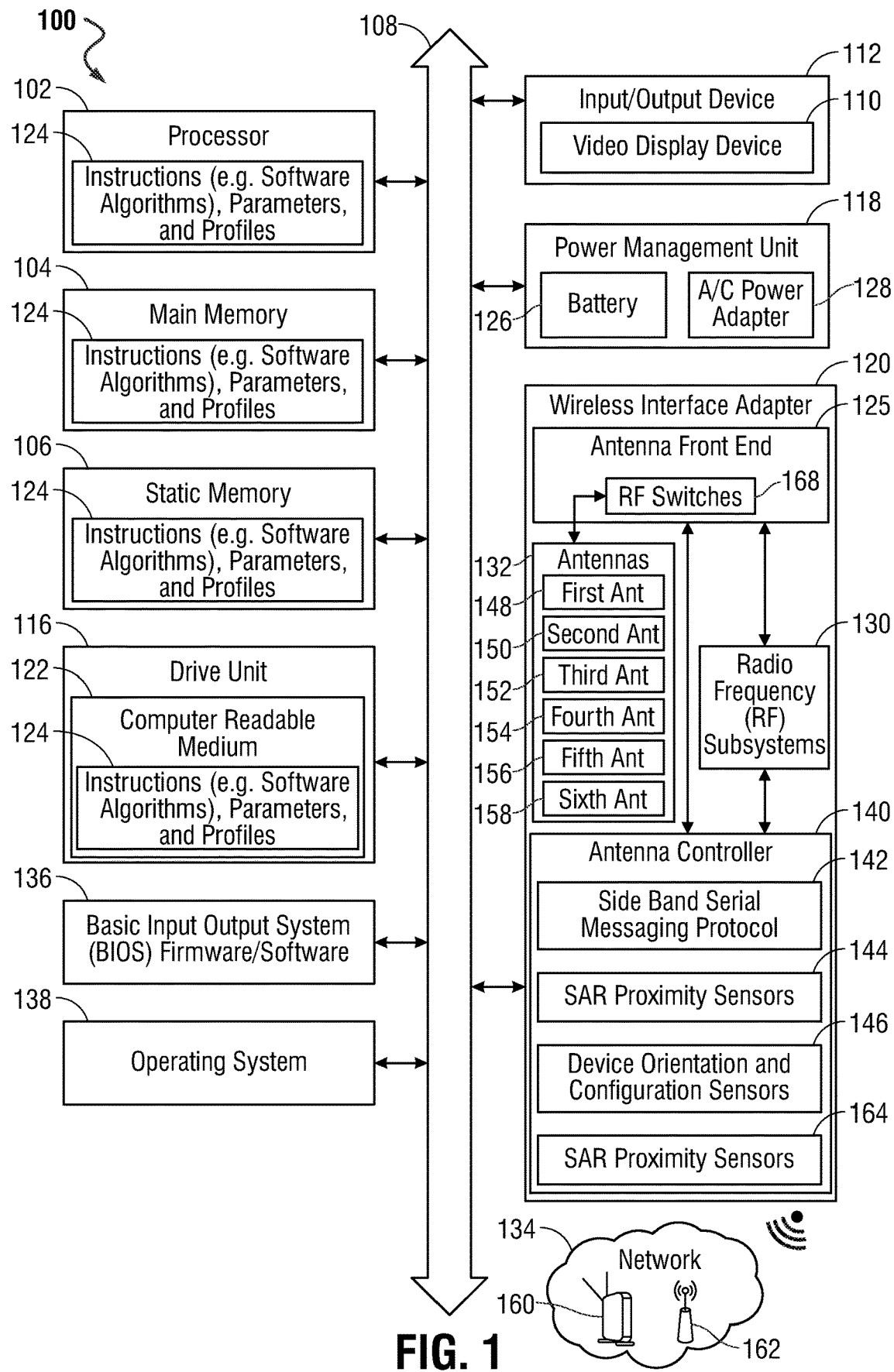
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Information handling systems including those that are mobile in embodiments of the present disclosure address this need by employing a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams to enhance data bandwidth or reliability.

Current configurations involving a plurality of antenna systems operating on a variety of RATs encounter potential problems associated with interference between each of the antennas, compliance with Federal Communications Commission (FCC) standard absorption rate (SAR) requirements across all antennas, a received signal strength indicator (RSSI), base rate over range performance of the plurality of available antennas due to antenna radiation pattern coverage, available of networks to the information handling system to operatively couple to, and incompatibility between radio modems manufactured by different upstream devices, among other system operation and connection metrics. For example, a signal strength (e.g., as a detected RSSI) associated with a WLAN communication access point may be inferior to the signal strength associated with a WWAN communication access point. In another example, operation of one antenna as compared to another antenna within the information handling system may be impeded via a user's body part such that a radio frequency (RF) signal cannot be transmitted or received. Embodiments of the present disclosure address this issue by providing an antenna controller capable of switching from one set and type of antenna device to another based on specific absorption rate (SAR) data from a plurality of SAR sensors, RSSI indicators, system operation and connection metrics including the RSSI data, from the antenna controller executing a sideband serial messaging protocol, and configuration data descriptive of a configuration of the information handling system in order to increase the reliability of signal and transmission and reception of data across any type of network.

The SAR data, RSSI data, system operation and connection metrics, and configuration data may be used as input to an antenna selection algorithm used by the antenna controller to determine which of the plurality of antennas within the information handling system to use in order to communicate with any type of communication network. In an embodiment, the output may be a specific selection of antennas that can operate in an N×N multiple-in-multiple-out (MIMO) array configuration in order to increase the amount of data transmitted by and received at the information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna selection algorithm, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as wireless interface adapter 120 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point used to operatively coupled the information handling system 100 to a network. In a specific embodiment, the network 134 may include macro-cellular connections via one or more base stations 162 or a wireless access points 160 (e.g., Wi-Fi or WiGig), or such as through licensed or unlicensed WWAN small cell base stations. Connectivity may be via wired or wireless connection. Wireless interface adapter 120 may include one or more radio frequency subsystems 130 with transmitter/receiver circuitry, modem circuitry, one or more antenna front end 125 circuits, one or more wireless controller circuits, amplifiers, one or more antennas 132 and other circuitry of the radio frequency subsystem 130 such as one or more antenna ports used for wireless communications via multiple radio access technologies. Each radio frequency subsystem 130 may communicate with one or more wireless technology protocols such as WLAN or WWAN wireless technology protocols. The radiofrequency subsystem 130 may contain individual subscriber identity module (SIM) profiles for each technology service provider and their available protocols for any operating subscriber-based radio access technologies such as cellular LTE communications.

The wireless interface adapter 120, also known as a wireless interface device, may also include antennas 132 which may include any number of tunable antennas for use with the system and methods disclosed herein. In the embodiment shown in FIG. 1, the antennas 132 may include a first antenna 148, a second antenna 150, a third antenna 152, a fourth antenna 154, a fifth antenna 156, and a sixth antenna 158. However, the present specification contemplates that the antennas 132 may include more or less of the number of antennas 148, 150, 152, 154, 156, 158 shown in FIG. 1. Additional antenna system modification circuitry (not shown) may also be included with the wireless interface adapter 120 to implement coexistence control measures via an antenna controller 140 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands. In a specific embodiment described herein, the shared, wireless communication band may be transmitted through a plurality of antennas used to operate in an N×N MIMO array configuration where multiple antennas 148, 150, 152, 154, 156, 158 are used to exploit multipath propagation which may be any variable N. For example, N may equal 2 or 4 to be 2×2 or 4×4 MIMO operation in some embodiments. Other communication frequency bands are contemplated for use with the embodiments of the present disclosure as well and the present specification contemplates the use of a variety of communication frequency bands.

In other aspects, the information handling system 100 operating as a mobile information handling system may operate a plurality of wireless interface adapters 120 for concurrent radio operation in one or more wireless communication bands. The plurality of wireless interface adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The radio transmission or reception operates under the wireless interface adapter 120 made to execute an antenna selection algorithm and potentially make antenna system adjustments according to present disclosure.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN or WiGig connectivity and one or more additional antenna system transmitters for macro-cellular communication. The radio frequency subsystems 130 include wireless controllers to manage authentication, connectivity, communications, power levels for transmission, buffering, error correction, baseband processing, and other functions of the wireless interface adapter 120.

The information handling system 100 may also, via the RF subsystems 130 of the wireless interface adapters 120, measure various metrics relating to wireless communication and provide that data to operation an antenna selection algorithm 164 as described in the present disclosure. For example, the antenna controller 140 and radio frequency subsystem 130 may manage detecting and measuring received signal strength levels, bit error rates (BER), signal to noise ratios, latencies, jitter, and other metrics relating to signal quality and strength of any of a plurality of communication networks made available to the information handling system 100. Some metrics relating to signal quality and strength of a wireless connection to a communication network may include a received signal strength indicator (RSSI). Additionally, the antenna controller 140 and radio frequency subsystem 130 may manage detecting which communication networks are available to the information handling system 100 to be operatively coupled to. In an embodiment, the detecting of communication networks available to the information handling system 100 may be accomplished using an out-of-band (OOB) communication to each of these networks. This may operate as a sideband communication by the antenna controller 140 to discover potential networks, discover telemetry data on those networks such as bandwidth, data congestion, channel availability, among others, as well as any other data related to the potential communication of the information handling system 100 with these networks. In this example, the information handling system 100 may communicate with a backend server or other server on the network to obtain this data from one of an information handling system management system such as Dell Optimizer® or a third-party organization contracted to provide this data. The OOB communications may be wireless communications via an existing wireless radio technology such as WLAN or WWAN wireless links with the connection to the backend server or other server hosting the information handling system management system.

In an embodiment, the antenna controller 140 of the wireless interface adapter 120 may, via the antenna front end 125, manage one or more radio frequency subsystems 130 to manage transmission power levels which directly affect RF subsystem 130 power consumption as well as transmission power levels from the plurality of antennas 132. The transmission power levels from the antennas 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more of a set of antennas 132. Additional SAR data may be received via operation of a number of SAR proximity sensors 144 located at or near each of the antennas 148, 150, 152, 154, 156, 158 of the antennas 132 described herein. In this embodiment, the power levels provided to the antennas 148, 150, 152, 154, 156, 158 of the antennas 132 may be compared to the data received by the SAR proximity sensors 144 to determine this SAR safety limitations as well as determine whether, for example, a user's body part is absorbing this RF electromagnetic radiation. This data may be provided to the antenna controller 140 executing the antenna selection algorithm 164 to determine which of the plurality of antennas 148, 150, 152, 154, 156, 158 should be used to operate in the N×N MIMO array configuration described herein. During operation, when the antenna controller 140 determines that data transmission should be switched from one of the antennas 148, 150, 152, 154, 156, 158 to another, the antenna controller 140 may direct the antenna front end 125, via the RF subsystems 130, to activate an RF switch 168 to make the switch among the set of antennas 132 as described in embodiments herein.

In an embodiment, the antenna controller 140 may also include device orientation and configuration sensors 146. The device orientation and configuration sensors 146 may, upon execution by the processor 102, receive input from any number of sensors and organize the data from that input in order to track the orientation, configuration, and/or location of the information handling system 100. These sensors may include, for example, a temperature sensor, a pressure sensor, a hall effect sensor, a magnetic sensor, an accelerometer, a magnetometer, a hinge sensor, a light sensor (e.g., ultraviolet light sensor, ambient light sensor), a camera, and a color sensor, among others. Each of these sensors may provide data to an integrated sensor hub which provides that data to the antenna controller 140 to be used as input to the antenna selection algorithm 164. These sensors may be actively operating in order to describe the orientation, configuration, and location of the information handling system 100 at any given time.

The antenna controller 140 may also include a sideband serial messaging protocol 140 that, when executed by the antenna controller 140, initiates a sideband communication with at least one of the plurality of networks described herein. In an embodiment, the sideband communication may be any wireless communication link with any wireless network apart from a concurrently initiated communication link. In an embodiment, the sideband communication link achieved via execution of the sideband serial messaging protocol 140 may allow the antenna controller 140 to determine which wireless networks are available to operatively couple the information handling system 100 to a wireless network as well as any system operation and connection metrics associated with those wireless networks. Again, because the system operation and connection metrics includes RSSI data descriptive of a measured received signal strength level, bit error rate, signal to noise ratio, latency, jitter, and other metrics relating to signal quality and strength of any of each of a plurality of communication networks, the data obtained by the antenna controller 140 may be used during execution of the antenna selection algorithm 164 to determine which wireless network to operatively couple the information handling system to.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

During operation of the information handling system 100, the processor 102 may cause the antenna controller 140, via the RF subsystems 130, to initiate a sideband communication link by executing the sideband serial messaging protocol 142. In this embodiment, the sideband serial messaging protocol 140 may include any instructions executable by the processor 102 to identify any potential communication link available to the information handling system 100 that operatively couples the information handling system 100 to any type of network described herein. In an embodiment, the antenna controller 140 may execute the sideband serial messaging protocol 140 to operatively couple the information handling system 100 to a Wi-Fi access point in order to harvest Wi-Fi operating band data, channel data, along with other system operation and connection metrics associated with that Wi-Fi network or any available Wi-Fi network. Additionally, or alternatively, the antenna controller 140 may execute the sideband serial messaging protocol 140 to operatively couple the information handling system 100 to a WLAN or WWAN access point such as the wireless access point 160 or base stations 162 within any network as described herein. In this embodiment, by operatively coupling the information handling system 100 to these wireless access points 160 and base stations 162, the information handling system 100 may harvest channel state information and other system operation and connection metrics. Examples of these system operation and connection metrics may include frequencies of the communication bands, bands used, channels used, concurrent WWAN and WLAN channels, non-concurrent WWAN and WLAN channels, idle metrics, disconnected states, signal strength metrics, and identification of radio access technology used to communicate with the network, networks may include those such as 4G, licensed-assisted access (LAA), 5G, Wi-Fi6, Wi-Fi6e, and may implement wire links utilizing Wi-Fi dual-band simultaneous (DBS) operation, uplink or downlink MIMO, a number of spatial streams, among other wireless link types for which metrics and operating characteristics may be measured. In this way, the antenna controller 140 may help to determine which wireless protocol (e.g., Wi-Fi, WLAN, WWAN) is actively operating by the information handling system 100 and then switch the RF switch 168 of the antenna front end 125 to engage a shared antenna element with the operating wireless protocol based on the system operation and connection metrics including the RSSI data, the SAR data, and the configuration data descriptive of a configuration of the information handling system. While this may reduce the MIMO capability, for example, of another wireless protocol, it may not entirely eliminate utilization of such a wireless protocol. For example, Wi-Fi may not always be available for a mobile information handling system such as a laptop. If Wi-Fi is not available, an antenna controller 140 may detect such a state and execute an RF switch 168 to enable one or more shared antenna elements to operate with a cellular wireless subsystem in an embodiment to enhance data bandwidth and wireless coverage. For example, four antenna elements may be available to the cellular subsystem and provide for 4×4 MIMO connectivity. In another embodiment, if Wi-Fi is detected as available or operational, the antenna controller may allocate one or more shared antennas via the RF switch 168 to the Wi-Fi wireless subsystem to enable Wi-Fi communications (e.g., 2×2 MIMO Wi-Fi communications). Remaining antennas may still provide for some portion cellular wireless subsystem communication (e.g., 2×2 MIMO cellular communications). The shared antenna elements may then effectively transmit communications signals depending on the wireless conditions determined by the antenna controller, system operation and connection metrics such as the RSSI data, the SAR data, and the configuration data descriptive of a configuration of the information handling system.

In an embodiment, the system operation and connection metrics may be obtained by the antenna controller 140 via execution of a sideband serial messaging protocol 140. This system and operation and connection metrics may be used as input to the antenna selection algorithm 164. As input, the system operation and connection metrics may help to determine which of a plurality of antennas 148, 150, 152, 154, 156, 158 to use in order to be used to operate in the N×N MIMO array configuration as a determined wireless protocol subsystem (e.g., Wi-Fi, other WLAN, WWAN, etc.).

In addition to retrieving the system operation and connection metrics, the antenna controller 140 may also obtain any SAR data from a plurality of SAR proximity sensors 144. The retrieval of this SAR data may be done concurrently along with the retrieval of the system operation and connection metrics described herein. The SAR data is gathered using a SAR proximity sensor 144 associated with every antenna 148, 150, 152, 154, 156, 158 formed within the information handling system 100. Additionally, the transmission power levels (e.g., current and voltage) from the set of antennas 132 may be relevant to specific absorption rate (SAR) safety limitations for transmitting mobile information handling systems and may be used to develop the SAR data provided to the antenna controller 140. This SAR data may also be used by the antenna controller 140 executing the antenna selection algorithm 164 as input to the antenna selection algorithm 164 in order to help determine which of a plurality of antennas 148, 150, 152, 154, 156, 158 to use in order to be used to operate in the N×N MIMO array configuration.

In addition to retrieving the system operation, SAR data, and connection metrics, the antenna controller 140 may also obtain any RSSI data or other wireless signal quality metrics. In one embodiment, RSSI data may be retrieved from, for example, an intermediate-frequency (IF) amplifier used by the wireless interface adapter 120 to raise or lower signal levels at the RF subsystems 130 by increasing or decreasing the power applied to each of the antennas 148, 150, 152, 154, 156, 158. If and when the RSSI drops, for example, the SAR data may also be cross-referenced to determine whether the drop in transmission is due to the presence of a human body or a drop in power otherwise provided to or received by any given antenna 148, 150, 152, 154, 156, 158.

In addition to retrieving the system operation, RSSI data, and connection metrics and the SAR data as described, the information handling system 100 may gather configuration data descriptive of a configuration of the information handling system 100. The configuration of the information handling system 100 may be determined by the antenna controller 140 using a number of additional types of sensors. In the context of the information handling system 100 being a 360-degree-type laptop, these sensors may be used to determine if the orientation the information handling system 100 is placed in is one of a tablet configuration, a dual tablet configuration, a laptop configuration, a tent mode configuration, a book configuration, as well as several other configurations described herein. These variety of sensors may include, for example, a hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system 100.

In an example embodiment, the hall effect sensor may be placed at any location within the chassis of the information handling system 100 to detect the position of the individual parts of the information handling system 100 relative to each other. In a specific embodiment where the information handling system 100 is a laptop-type information handling system 100, the hall effect sensor may be placed in one or more of a display portion or base portions of the information handling system 100. In this embodiment, the hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system 100. As described herein, this allows the hall effect sensor and other sensors to detect whether the laptop-type information handling system 100 is placed in a tablet configuration, a dual tablet configuration, a laptop configuration, a tent mode configuration, a book configuration, as well as several other configurations described herein. The hall effect sensor and other sensors may be similarly used in a dual screen-type information handling system 100 in order to detect the relative positions of each of the screens. Again, any data obtained by the hall effect sensor and other sensors is presented to the antenna controller 140 for the antenna controller 140 to interpret and provide that orientation data as input to the antenna selection algorithm 164 as descried herein.

In an embodiment, a magnetometer may operate as an orientation sensor and may be used to measure the earth's magnetic field at any location in order to detect an orientation of the information handling system 100 relative to that magnetic field. In a specific embodiment, the magnetometer may be a three-axis magnetometer that eliminates the sensitivity to the way in which the information handling system 100 is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 140 for the antenna controller 140 to interpret and provide as input to the antenna selection algorithm 164 as descried herein.

When the SAR data, RSSI data, system operation and connection metrics, and configuration data are received by the antenna controller 140, the antenna controller 140 may execute the antenna selection algorithm 164 in order to identify which among a plurality of transceiving antennas are to be used to operate in the N×N MIMO array configuration. The antenna selection algorithm 164 may be any executable code that receives, as input, the SAR data, RSSI data, system operation and connection metrics, and configuration data and provides, as output a selection of a plurality of antennas to be used to operate in the N×N MIMO array configuration based in part on the known locations of the plural antenna systems mounted on the information handling system 100. As such, the information handling system 100 may periodically monitor for changes in the SAR data, RSSI data, the system operation and connection metrics, and the configuration data in order to determine if and when to switch any number of antennas for the location on the information handling system to transceive data across any type of network.

In an embodiment, the antenna selection algorithm 164 may include a look-up table. This look-up table may include a trigger used to denote a currently-detected configuration of the information handling system used to define the configuration data described herein. The look-up table may also include, based on the received SAR data, a determination as to whether a human body part such as the user's hand or lap is close to any of one of the antennas. The look-up table may also include an antenna selection based on the system operation and connection metrics as described. In an embodiment, where the information handling includes four antennas, such a look-up table may look like the following table (Table 1):

TABLE 1

| Configuration Trigger | First Antenna SAR Data | Second Antenna SAR Data | Third Antenna SAR Data | Fourth Antenna SAR Data | Bluetooth + Wi-Fi 2X2 MIMO Selection | |
|---|---|---|---|---|---|---|
| Laptop | Proximity, Avoid | No Proximity, Select | Proximity, Avoid | No Proximity, Select | Antenna A = 4 | Antenna B = 2 |

TABLE 1-continued

| Configuration Trigger | First Antenna SAR Data | Second Antenna SAR Data | Third Antenna SAR Data | Fourth Antenna SAR Data | Bluetooth + Wi-Fi 2X2 MIMO Selection | |
|---|---|---|---|---|---|---|
| Laptop | No Proximity, Select | No Proximity, Select | Proximity, Avoid | Proximity, Avoid | Antenna A = 1 | Antenna B = 2 |
| Laptop | Proximity Signal Strength = Low | Proximity Signal Strength = Medium | Proximity Signal Strength = Low | Proximity Signal Strength = Medium | Antenna A = 4 | Antenna B = 2 |
| Tablet | Signal Strength = Medium | Signal Strength = Low | Proximity Signal Strength = Medium | Proximity Signal Strength = Low | Antenna A = 1 | Antenna B = 3 |
| Laptop | Signal Strength = Medium | Signal Strength = High | Signal Strength = High | Signal Strength = Medium | Antenna A = 2 | Antenna B = 3 |

In this example look-up table, a number of configurations (e.g., laptop, tablet, lid closed) indicate the orientation of a display chassis of a notebook-type information handling system 100 relative to its keyboard or base chassis. When the lid or display chassis is in an open laptop state on a laptop-type information handling system for example, the user can view the display while interacting with the keyboard placed within the base chassis. When the lid or display is in a closed state on a laptop-type information handling system, the display is not viewable due to the display chassis being closed against the base chassis. It is appreciated that in the closed position, the user may still interact with operation of the information handling system when, for example, the information handling system 100 is docked at a docking station and an external monitor is used as an out device. It is further appreciated that other configurations of the information handling system 100 apart from a closed and laptop positions are anticipated in the present specification. As described, these other configurations include tablet configuration where the information handling system is in a tablet form or where the base portion of the information handling system is made to flip behind the display portion. As understood, in a lid open tablet state, the user may handle the information handling system 100 to interact with the display screen 110 while a keyboard is opened around behind the display screen such as in a convertible laptop system. In a dual tablet configuration the information handling system may be made of a base portion that includes a separate display device along with the display device of the display portion of the information handling system. In this dual table configuration, the base portion and display portion are laid open to reveal both display devices to the user. In a laptop configuration, the information handling system may have the base portion on a table or on the user's lap with the display portion upright and viewable to the user. In a tent mode configuration, the display portion may be viewable to the user with the base portion in an orientation to prop up the display portion on a table, for example. In a book configuration, the base portion and display portion of the information handling system may be opened up to the user and the system rotated like the user has a book open. Several other configurations described herein may also be used. The look-up table shown in Table 1 may be expanded to reflect the updated configuration data and the resulting SAR data, RSSI, and system operation and connection metrics that result from the information handling system 100 being placed in these additional configurations. In some embodiments, the SAR data and RSSI data may be provided to the antenna controller 140 to determine if the drop in RSSI is due to the presence of a user's body or a drop in power provided to the antenna systems due to a specific configuration. It is appreciated that these individual configurations may affect the transmission and reception capabilities of any of the antennas 148, 150, 152, 154, 156, 158 within the information handling system 100 due to their placement within the chassis of the information handling system 100. For example, where some of the antennas 148, 150, 152, 154, 156, 158 are placed in the base portion of a laptop-type information handling system 100, placing the laptop on a user's lap or a user holding a tablet or the flipped around configuration may affect the ability of those antennas 148, 150, 152, 154, 156, 158 to transmit or receive data. This may be evidenced by the resulting SAR data or RSSI data as indicated in Table 1.

Table 1 shows a plurality of example scenarios (e.g., rows 2, 3, 4, and 5 in the table) where the lid or display panel of the information handling system 100 is either closed or open. In a first scenario (e.g., as defined in row 2), for example, the lid is open. Here the first antenna 148 has a SAR proximity sensor 144 that provides input to the antenna controller 140 indicating, in this example, that a user's body is near the first antenna 148 and to avoid the use of the first antenna 148. The SAR proximity sensor 144 placed next to the second antenna 150, however, indicates that no part of the user's body (or any other object) is close to the second antenna 150 impacting the transmission or reception of data at the second antenna 150. The SAR proximity sensor 144 associated with the third antenna 152 may, similar to the first antenna 148, indicate that a user's body is near the third antenna 152 and to avoid the use of the third antenna 152. Additionally, in the first scenario the SAR proximity sensor 144 associated with the fourth antenna 154 indicates that the user's body is not near the fourth antenna 154. In this example scenario, for the purposes of Bluetooth and Wi-Fi communications (e.g., Wi-Fi 6e communications) under a 2×2 MIMO communication scenario, one of the antennas (e.g., antenna "A") used includes the fourth antenna 154 while another antenna (e.g., antenna "B") used in the 2×2 MIMO includes the second antenna 150. As such, the antenna selection algorithm 164 as defined by Table 1, for example, has been used to facilitate the N×N MIMO array configuration as described herein (e.g., where N=2).

In another scenario (e.g., fifth row in Table 1), the signal strength of the each of the antennas are as follows based on their respective SAR readings from associated SAR proximity sensors 144: first antenna 148 signal strength is medium, second antenna 150 signal strength is high, third antenna 152 signal strength is high, and the fourth antenna 154 signal strength is medium. In this scenario, because the lid is in an open configuration (e.g., information handling system 100 is placed in the open configuration) all the antennas may be a certain level of signal strength. However, as indicated, the second antenna 150 and third antenna 152 have been selected to operate under the N×N MIMO array configuration (e.g., N=2) based on their relatively higher signal strength for a wireless protocol operating with a MIMO wireless links for additional data bandwidth.

Again, although table 1 does not show it, any system operation and connection metrics may also be considered in the selection of antennas 148, 150, 152, 154, 156, 158 to be used in this 2×2 MIMO array configuration. These system operation and connection metrics may include frequencies of the communication bands, bands used, channels used, concurrent WWAN and WLAN channels and non-concurrent WWAN and WLAN channels made available to the information handling system 100. Other types of operation and connection metrics may include idle metrics, disconnected states, and signal strength metrics that each describe the stability of those communication protocols available to the information handling system. In an embodiment, data related to the radio access technology used to communicate with the network such as 4G, licensed-assisted access (LAA), 5G, Wi-Fi6, Wi-Fi6e, and Wi-Fi dual-band simultaneous (DBS) may be acquired as well. Additionally, in an embodiment, link algorithms such as uplink MIMO and number of spatial streams, among other metrics and operating characteristics may be gathered.

Additionally, although the look-up table as described in Table 1 shows that four antennas are placed within the information handling system 100 and used to operate in an N×N MIMO array configuration as well as support plural wireless protocols, the present specification contemplates that any number of additional antennas 148, 150, 152, 154, 156, 158 may be used. In an example embodiment, the information handling system 100 may include six or more antennas 148, 150, 152, 154, 156, 158. In this embodiment, these antennas 148, 150, 152, 154, 156, 158 may include a mix of WLAN and WWAN antennas operating under their protocols and used to operatively couple the information handling system to any type of network 134 including WLAN and WWAN networks. In this embodiment, the antenna controller 140 may operatively switch from any given pair of antennas 148, 150, 152, 154, 156, 158 operating under one or more optimal N×N MIMO array configuration to any other pair of antennas 148, 150, 152, 154, 156, 158 to continue the same or a different N×N MIMO array configuration. A look-up table used to accommodate the switching of any given antenna from a first wireless protocol to another may include a number of scenarios used to define which plurality of antennas are to be used based on the SAR data, RSSI data, the configuration data, and the system operation and connection metrics descried herein. This look-up table may also include system and signal telemetry data effects on such a decision. This look-up table may also include an antenna selection and technology mapping section based on known antenna location on the information handling system used to define which of the antennas 148, 150, 152, 154, 156, 158 should or could be used (e.g., switched to be used under a different wireless protocol) to operatively couple the information handling system 100 to a network 134.

In another embodiment, the information handling includes six antennas, and a look-up table may look like the following table (Table 2):

TABLE 2

| | System and Signal Telemetry Inputs | | | Antenna Selection and Technology Mapping | | | | | |
|---|---|---|---|---|---|---|---|---|---|
| Scenario | Radio Mode | Signal Strength Trigger | SAR Proximity Sensor Trigger | Integrated Sensor Hub Trigger | Antenna 1 | Antenna 2 | Antenna 3 | Antenna 4 | Antenna 5 | Antenna 6 |
| 1 | WWAN (5G) + WLAN | Monitor Antenna 1, 2, 3, 4, 5, 6 | None | Laptop | WWAN Main - TRx (4G/5G) | WWAN Aux Rx (4G/5G) | WWANHB (TRx)/ WLAN Diversity (TRx) | WWANHB (Rx)/WLAN Diversity (TRx) | WLAN Main (TRx) | WLAN Aux (TRx) |
| 2 | WWAN (5G) + WLAN | Monitor Antenna 4, 6 | Antenna 1 Antenna 5 | Laptop | WWAN Aux Rx (4G/5G) (not used) | WWAN Main - TRx (4G/5G) | WLAN Main (TRx) | WWANHB/ WLAN Diversity (TRx) | WWANHB/ WLAN Diversity (TRx) (not used) | WLAN Aux (TRx) |
| 3 | WLAN 6 (R1/R2) | | Antenna 5 Antenna 6 | Tent | Disconnected | Disconnected | WLAN Main (TRx) | WLAN Aux (TRx) | WLAN Diversity (TRx) (not used) | WLAN Diversity (TRx) (not used) |
| 4 | WWAN 5G | Monitor Antenna 1, 2 | Antenna 3 Antenna 4 | Tablet | WWAN Main - TRx (4G/5G) | WWAN Aux Rx (4G/5G) | WWANHB Diversity (not used) | WWANHB Diversity (not used) | WWANHB MIMO1 TRx (5G), Rx (4G) | WWANHB MIMO2 Rx (4G/5G) |
| 5 | WWAN 4G | | Antenna 1 Antenna 5 Antenna 6 | Laptop | WWAN Aux Rx (4G) (not used) | WWAN Main - TRx (4G/5G) | WWANHB MIMO1 Rx (4G) | HB MIMO2 Rx (4G) | WWANHB Diversity (not used) | WWANHB Diversity (not used) |
| 6 | WWAN + WLAN | Monitor Antenna 1, 2, 3, 4, 5, 6 | None | Lid Closed | WWAN Main - TRx (4G/5G) | WWAN Aux Rx (4G/5G) | WLAN Main (TRx) | WLAN Aux (TRx) | WWANHB (TRx)/WLAN Diversity (TRx) (not used) | WWANHB (Rx)/WLAN Diversity (TRx) (not used) |

Table 2 shows six different scenarios related to the operation of a plurality of antennas 148, 150, 152, 154, 156, 158 within the information handling system 100. It is appreciated, however, that more scenarios could occur due to changes in RSSI data, SAR data, and configuration data, as well as any telemetry data received via the sideband communication described herein. In this embodiment, these antennas 148, 150, 152, 154, 156, 158 may be switched between use in order to facilitate one or more wireless protocols where at least one may operate in a N×N MIMO array configuration transmissions at a determined wireless protocol subsystem (e.g., Wi-Fi. WLAN, WWAN, etc.) as described herein. Table 2 shows a first column depicting a specific scenario where the antennas are reassigned or not based on the radio mode priority depicted in the second column. The prioritized radio mode may be determined based, at least partially, on the application being executed on the information handling system and the detected networks made available to the information handling system 100 at the time. For example, where data transception is a priority, that communication protocol (e.g., WLAN or WWAN) that can be used to transmit and receive data the quickest with the best signal strength may be selected and the priority radio mode may be set accordingly. As described herein, the telemetry data associated with any available network obtained during execution of the sideband communication may be used to make this decision. The third column of Table 2 shows which antennas are being monitored for signal strength (e.g., RSSI) in anticipation to potentially switch to those antennas should another antenna has a lower signal strength. The fourth column indicates whether any SAR sensor (P-sensor or proximity sensor) associated with any specific antenna has been triggered. The fifth column indicates the orientation of the information handling system 100 that may affect the line of sight to an access point 160 or base station 162 of any given antenna formed in the base of the information handling system. Again, a number of configurations (e.g., laptop, lid open, lid closed, tent, tablet) indicate the orientation of a display chassis of a notebook-type information handling system 100 relative to its keyboard or base chassis when present. When the lid or display chassis is in an open laptop state on a laptop-type information handling system for example, the user can view the display while interacting with the keyboard placed within the base chassis. When the lid or display is in a closed state on a laptop-type information handling system, the display is not viewable due to the display chassis being closed against the base chassis. Other configurations also include tablet configuration where the information handling system is in a tablet form or where the base portion of the information handling system is made to flip behind the display portion. In a dual tablet configuration, the information handling system may be made of a base portion that includes a separate display device along with the display device of the display portion of the information handling system. In this dual table configuration, the base portion and display portion are laid open to reveal both display devices to the user. In a laptop configuration, the information handling system may have the base portion on a table or on the user's lap with the display portion upright and viewable to the user. In a tent mode configuration, the display portion may be viewable to the user with the base portion in an orientation to prop up the display portion on a table, for example. In a book configuration, the base portion and display portion of the information handling system may be opened up to the user and the system rotated like the user has a book open. Several other configurations described herein may also be used. The look-up table shown in Table 2 may be expanded to reflect the updated configuration data and the resulting SAR data, RSSI, and system operation and connection metrics that result from the information handling system 100 being placed in these additional configurations. In some embodiments, the SAR data and RSSI data may be provided to the antenna controller 140 to determine if the drop in RSSI is due to the presence of a user's body or a drop in power provided to the antenna systems due to a specific configuration. It is appreciated that these individual configurations may affect the transmission and reception capabilities of any of the antennas 148, 150, 152, 154, 156, 158 within the information handling system 100 due to their placement within the chassis of the information handling system 100. For example, where some of the antennas 148, 150, 152, 154, 156, 158 are placed in the base portion of a laptop-type information handling system 100, placing the laptop on a user's lap may affect the ability of those antennas 148, 150, 152, 154, 156, 158 to transmit or receive data. This may be evidenced by the resulting SAR data or RSSI data as indicated in Table 2.

The sixth column through the eleventh column in Table 2 indicate the selected operating parameters of the first antenna 148, second antenna 150, third antenna 152, fourth antenna 154, fifth antenna 156, and sixth antenna 158. The sixth column through the eleventh column indicate which communication protocols each antenna 148, 150, 152, 154, 156, 158 has been selected for in order to adhere to the radio mode prioritization presented in the second column. In some scenarios such as in the fourth scenario (e.g., Table 2, row 6), some antennas (e.g., the third antenna 152 and the fourth antenna 154) may be labeled a "diversity" antennas. The diversity label indicates that these antennas are not operating in the given scenario but may be used in that particular scenario should any of the input data (e.g., radio mode, signal strength, SAR proximity sensor trigger, or integrated sensor hub trigger) changes such that use of these diversity antennas is now available. This may occur for a number of reasons including changes to the type of application being executed on the information handling system 100, changes to RSSI data at these diversity antennas, changes to a position of a user's hand next to these diversity antennas, and changes to the configuration of the information handling system 100.

In an embodiment, the use of table 2 with the antenna selection algorithm 164, two out of four of the WWAN High Band (HB) antennas in the system may be selectively re-purposed as additional two WLAN antennas, making available four-antenna switched diversity, to select the best 2×2 WLAN MIMO antenna configuration. In another embodiment, the execution of the antenna selection algorithm 164 (some functions of which are represented in Table 2) allows for two WLAN antennas to be re-purposed as two additional WWAN High Band (HB) antennas thereby making available a four-antenna switched WWAN 5G HB diversity to select best 2×2 WWAN 5G MIMO HB antenna. The antenna selection algorithm 164, when executed, may also include the process of detecting suitability data used to determine which of the antennas 148, 150, 152, 154, 156, 158 may be switched between use in order to facilitate one or more wireless protocols where at least one may operate in a N×N MIMO array configuration transmissions at a determined wireless protocol subsystem (e.g., Wi-Fi. WLAN, WWAN, etc.) as described herein. The repurposing of the WLAN and WWAN antennas may be accomplished via a number of RF switches 168 switching from one technology to another upon the determination as to which antennas 148, 150, 152, 154, 156, 158 are to be used for the transceiving and reception of data under the N×N MIMO array configuration.

In an example embodiment hardware configuration, the fifth antenna 156 may be a WLAN antenna while the third antenna 152 is a WWAN high band MIMO antenna. The fifth antenna 156 and third antenna 152 may be operatively coupled to a first cross bar, double pole, double throw (DPDT) switch in order to, when appropriate, switch the third antenna 152 and fifth antenna 156 to the alternative communication protocol. Additionally, the sixth antenna 158 may be a WLAN antenna while the fourth antenna 154 is a WWAN high band MIMO antenna. The sixth antenna 158 and fourth antenna 154 may be operatively coupled to a second cross bar, DPDT switch in order to, when appropriate, switch the third antenna 152 and fifth antenna 156 to the alternative communication protocol. Further, the first antenna 148 may be a WWAN main antenna while the second antenna 150 is a WWAN auxiliary (Aux) antenna. The first antenna 148 and second antenna 150 may be operatively coupled to a third cross bar DPDT switch in order to toggle the first antenna 148 and second antenna 150 between acting as a main WWAN antenna or an auxiliary WWAN antenna.

In light of this example hardware configuration, a first scenario (row 3, Table 2) indicates that the RF subsystems 130 have detected, at the antenna controller 140, that concurrently operating antennas 148, 150, 152, 154, 156, 158 are to be operated under a current WWAN 5G protocol (e.g., using first antenna 148, second antenna 150, third antenna 152, and fourth antenna 154) and WLAN protocol (e.g., using fifth antenna 156 and sixth antenna 158). In this embodiment, this operation is based on concurrent state telemetry from a number of WWAN and WLAN antennas 132 obtained via the sideband communication link initiated by the antenna controller 140 via the RF subsystems 130. In an embodiment, a determination as to what wireless protocol to operate the antennas 148, 150, 152, 154, 156, 158 under may be based on the type of application being executed on the information handling system. For example, where a user is engaged in an online gaming system that requires relatively high data transmission to and from the information handling system to a network, a 5G WWAN wireless protocol may be used and the antennas 148, 150, 152, 154, 156, 158 devoted to the N×N MIMO array configuration transmissions may be accordingly repurposed to achieve the relatively higher level of data transmission and reception. However, where an email application is being executed, the number of antennas 148, 150, 152, 154, 156, 158 devoted to the execution of a WWAN protocol may be reduced.

Where, for example, WWAN protocol communications is to be prioritized, the best options of these concurrently operating antennas 148, 150, 152, 154, 156, 158 can be selected to support either of a 2×2 or 4×4 MIMO WWAN protocol communication depending on, for example, an application being executed by the processor 102 of the information handling system 100. Any antennas not being used for either a 2×2 or 4×4 WWAN protocol communication may be used for WLAN protocol communications concurrently with the WWAN protocol communication. During operation, however, the spatial location of the antennas 148, 150, 152, 154 operating in the 2×2 or 4×4 MIMO WWAN protocol communications may be prioritized to improve a line of sight for RF lobes in order to assist with short range, high-frequency protocols such as 5G or Wi-Fi 6E. With the relatively higher frequencies used, more data may be transmitted to and from the information handling system 100 thereby increasing the data throughput such that the execution of the application would be better facilitated. By way of example, where an online gaming application is being executed, the 2×2 or 4×4 MIMO WWAN protocol communication may select those antennas 148, 150, 152, 154 that can provide for the best connection and line of sight to an access point 160 or base station 162 (herein referred to as a network edge device) based on the SAR data and RSSI data received by the antenna controller 140. Because the line of sight and RSSI may be affected by the orientation and configuration of the information handling system 100, the antennas 148, 150, 152, 154 selected may dynamically change if and when the user's position changes or the orientation or configuration of the information handling system 100 changes.

As described herein, the antennas 132 used, channels communicating over, signal telemetry inputs received from the WWAN and WLAN antennas 132 operating, and signal strength indications (e.g., RSSI data) across the WWAN and WLAN antennas 148, 150, 152, 154, 156, 158 may be detected and provided to the antenna controller 140. In an embodiment, a preliminary mapping of any associated 4×4 WWAN antennas 148, 150, 152, 154, 156, 158 available at the information handling system may indicate that, for example, first through fourth antennas 148, 150, 152, 154 are mapped as the 4×4 WWAN array configuration and a fifth and sixth antenna 156 and 158 are mapped as a 2×2 WLAN antenna configuration.

In the first scenario, no SAR sensor 144 associated with any of the antennas 148, 150, 152, 154, 156, 158 have indicated any parts of the user's body (or any RF absorbing objects) are present around any of the antennas 148, 150, 152, 154, 156, 158 (e.g., "none" indicator in table 2). In this example scenario, the lid or display panel of the information handling system 100 may be in an open state and the laptop-type information handling system 100 may be resting on a table or desk as indicated by the sensors used to determine the configuration data described herein. Because these antennas 148, 150, 152, 154, 156, 158 may be physically located at, for example, an upper-most portion of the display portion of the information handling system 100, the RSSI data may indicate that transmission is appropriate via those antennas at that location. Additionally, because a user generally may not touch the top of the display portion of the information handling system 100, the SAR proximity sensor may indicate that no human body parts are located near those antennas.

In some embodiments, a plurality of sensors may be operatively coupled to an integrated sensor hub that is, in turn, operatively coupled to the antenna controller 140. These sensors may include, among others, a temperature sensor, a pressure sensor, a hall effect sensor, a magnetic sensor, an accelerometer, a magnetometer, gyroscope sensor, a hinge sensor, a light sensor (e.g., ultraviolet light sensor, ambient light sensor), a camera, and a color sensor. Each of these sensors may be used to detect the specific orientation of the information handling system 100 at any time.

When WLAN communication protocols are prioritized, in one example scenario (scenario 1, row 3, table 2), the antenna controller 140 may toggle the first DPDT switch and the second DPDT switch to cross over the pair of WWAN high-band MIMO antenna signals to the WLAN antennas and visa versa with the WLAN antenna signals to the WWAN HB MIMO antennas. While doing so, the antenna controller 140 is provided with signal strength data associated with the operation of each of the WWAN high-band (HB) MIMO antennas as well as the WLAN antennas. In this embodiment scenario, the antenna controller 140 selects the best 2×2 WLAN MIMO antenna and maps it to the RF subsystems 130 associated with WLAN data transmissions and receptions. Because the radio signal strength associated with the re-purposed WLAN diversity antennas (e.g., third and fourth antennas 152, 154) is not as strong as the originally associated WLAN MIMO antennas (e.g., fifth and sixth antennas 156, 158), the antenna controller 140 may leave the original antenna mapping unchanged as the best 2×2 MIMO WLAN antenna array. It is noted that some antennas may be mapped to operate as transmit/receive antennas (TRx) while others are mapped as antennas that are receiving antennas only (Rx) although they may be either WLAN antennas or WWAN antennas.

In the first scenario (row three, table 2), the first antenna 143 and third antenna 152 may operate as dual transmitting antennas during the 5G WWAN operating states in the embodiment shown where all six antennas 148, 150, 152, 154, 156, 158 have medium to strong signals. This dual operation of these first antenna 143 and third antenna 152 support E-UTRAN new radio (EN-DC) operations and provide for greater data bandwidth via the 5G WWAN wireless links used. Additionally, the fifth antenna 156 and the sixth antenna 158 may operate as dual transmit WLAN MIMO antennas in this first scenario for WLAN operating states. In these embodiments, the antenna controller 140 may continue to monitor the signal strength across all antennas 148, 150, 152, 154, 156, 158 periodically in a closed-loop fashion and may re-assign and map the antennas 148, 150, 152, 154, 156, 158 based on any updated SAR data, RSSI data, system operation and connection metrics, and configuration data as described herein and shown in other scenarios of Table 2.

As a further example, Table 2 provides additional scenarios of which a second scenario (4$^{th}$ row, Table 2) is one of them. In this scenario, a preliminary mapping of the antennas 148, 150, 152, 154, 156, 158 have the first antenna 148, the second antenna 150, the fourth antenna 154, and the fifth antenna 156 grouped together to form a 4×4 5G WWAN MIMO configuration. Additionally, the third antenna 152 and sixth antenna 158 are grouped together to form a 2×2 WLAN operating configuration. The third antenna 152 operating as a WLAN antenna and the fifth antenna 156 operating as a WWAN HB MIMO antenna are connected together via a first cross bar DPDT switch. The sixth antenna 158 operating as a WLAN antenna and the fourth antenna 154 operating as a WWAN HB MIMO antenna are also operatively coupled together via a second cross bar DPDT switch. The second antenna 150 operating as the main WWAN antenna and the first antenna 148 operating as an auxiliary WWAN antenna are operatively coupled together at a third cross bar DPDT switch.

In this second scenario, the SAR data, RSSI data, system operation and connection metrics, and configuration data are also provided to direct the operations of the individual antennas 148, 150, 152, 154, 156, 158 as described herein. In this embodiment, telemetry data along with other data from a SAR proximity sensor 144 may indicate that, at the first antenna 148 and fifth antenna 156, a user's body is close to these antennas and signal strength is weak and this information is sent to the antenna controller 140.

Because the first antenna 148 was the primary transceiving WWAN antenna in this scenario and because the RSSI and SAR values for the first antenna 148 indicate a weak signal strength, the antenna controller 140 activates the third cross bar DPDT switch (e.g., best antenna selection (BAS) switch) thereby mapping the second antenna 150 as the main WWAN antenna and the auxiliary (e.g., aux) WWAN transceiving (TRx) antenna being the second antenna 150. The fifth antenna 156, due to due a detected weak signal strength, is no longer the primary WLAN transceiving (TRx) antenna and the first cross bar DPDT may be switched to make the third antenna 152 (previously a WWAN HB MIMO antenna) as the main WLAN MIMO transceiving antennas. Further, according to this scenario, the antenna controller 140 toggles the second cross bar DPDT switch to detect the signal strength of the sixth antenna 158 operating as a WLAN MIMO antenna. Here, because the fourth antenna 154 signal strength is relatively weaker than the originally assigned sixth antenna 158, the antenna controller 140 maps the sixth antenna 158 as a WLAN MIMO transceiving antenna. This creates a 2×2 MIMO WWAN antenna operating array and a 2×2 MIMO WLAN operating array. This selection of antennas 148, 150, 152, 154, 156, 158 to their respective arrays now provides each array with a composition of those antennas that have the best signal strength, lowest SAR reading, and best spatial location of the antennas 148, 150, 152, 154, 156, 158 within the information handling system 100 relative to a network edge device to prioritize for their respective data transceptions and the prioritized radio mode of the information handling system 100. Again, the prioritized radio mode may be based, at least partially, on the type of application being executed on the information handling system and the type of data transmission protocols made available to the information handling system 100 at any given time.

In an embodiment, the wireless network 134 may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 134. Further, the instructions 124 may be transmitted or received over the network 134 via the network interface device or wireless interface adapter 120.

Wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. Wireless interface adapter 120 in an embodiment may operably connect to a network 134. Connection to network 134 may be wired or wireless.

The network interface device shown as wireless interface adapter 120 can provide connectivity to a network 134, such as a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 120 may include an adaptive massive MIMO Multiplexer with transmitter/receiver circuitry, wireless controller circuitry, amplifiers and other circuitry for wireless communications. The wireless interface adapter 120 may also include antennas 132 as described above which may be tunable antenna systems for use with the system and methods disclosed in the embodiments herein. The antenna controller 140 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute an antenna selection algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 140 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. For example, instructions relating to the dynamic switching of the antennas 148, 150, 152, 154, 156, 158 as described in the embodiments herein may be stored in a static memory 104. In a particular embodiment, the instructions, parameters, and profiles 124 may reside completely, or at least partially, within the main memory 104, the static memory 106, and/or within the disk drive 116 during execution by the processor 102 or an antenna controller 140 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
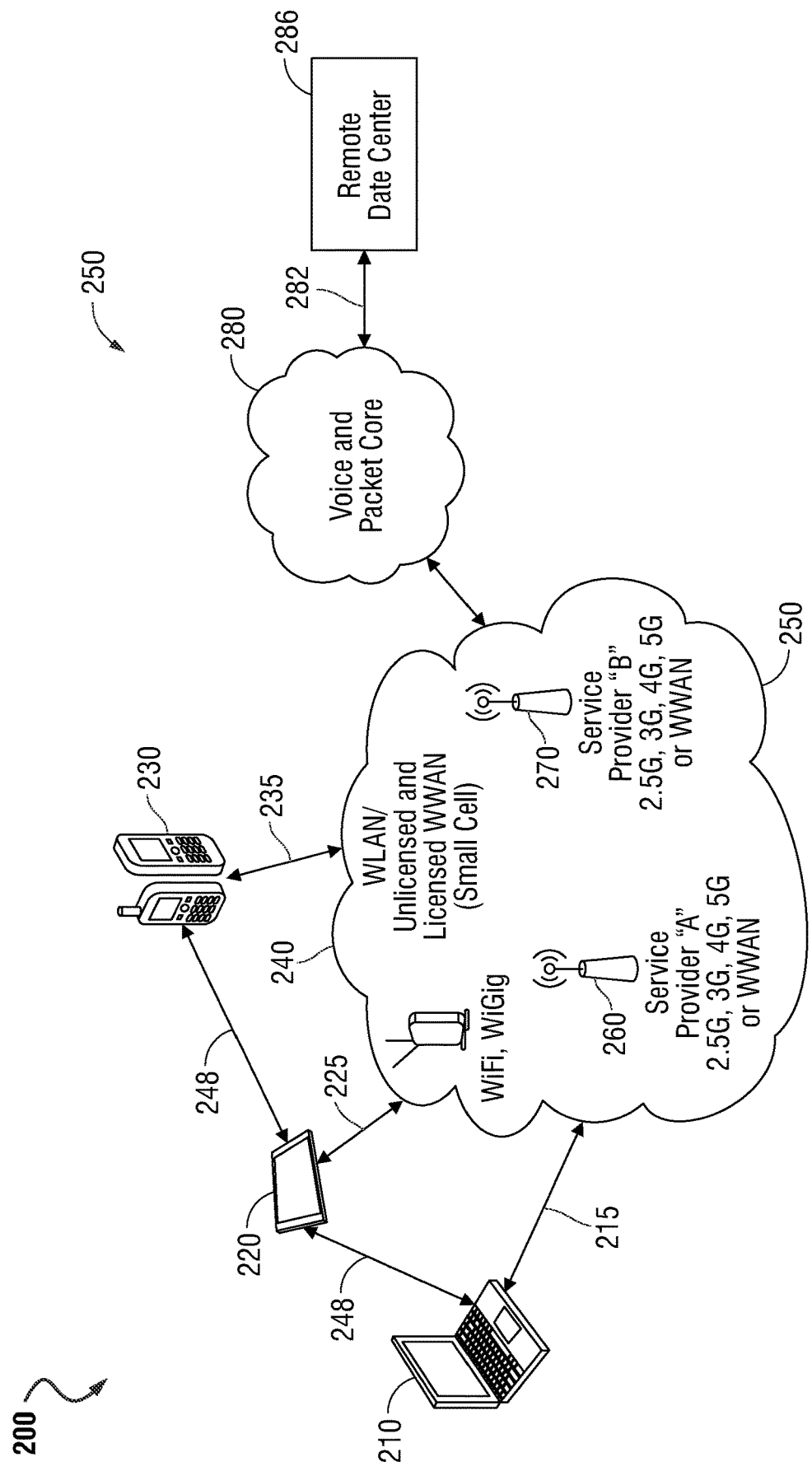
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points or base stations may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NRFR2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
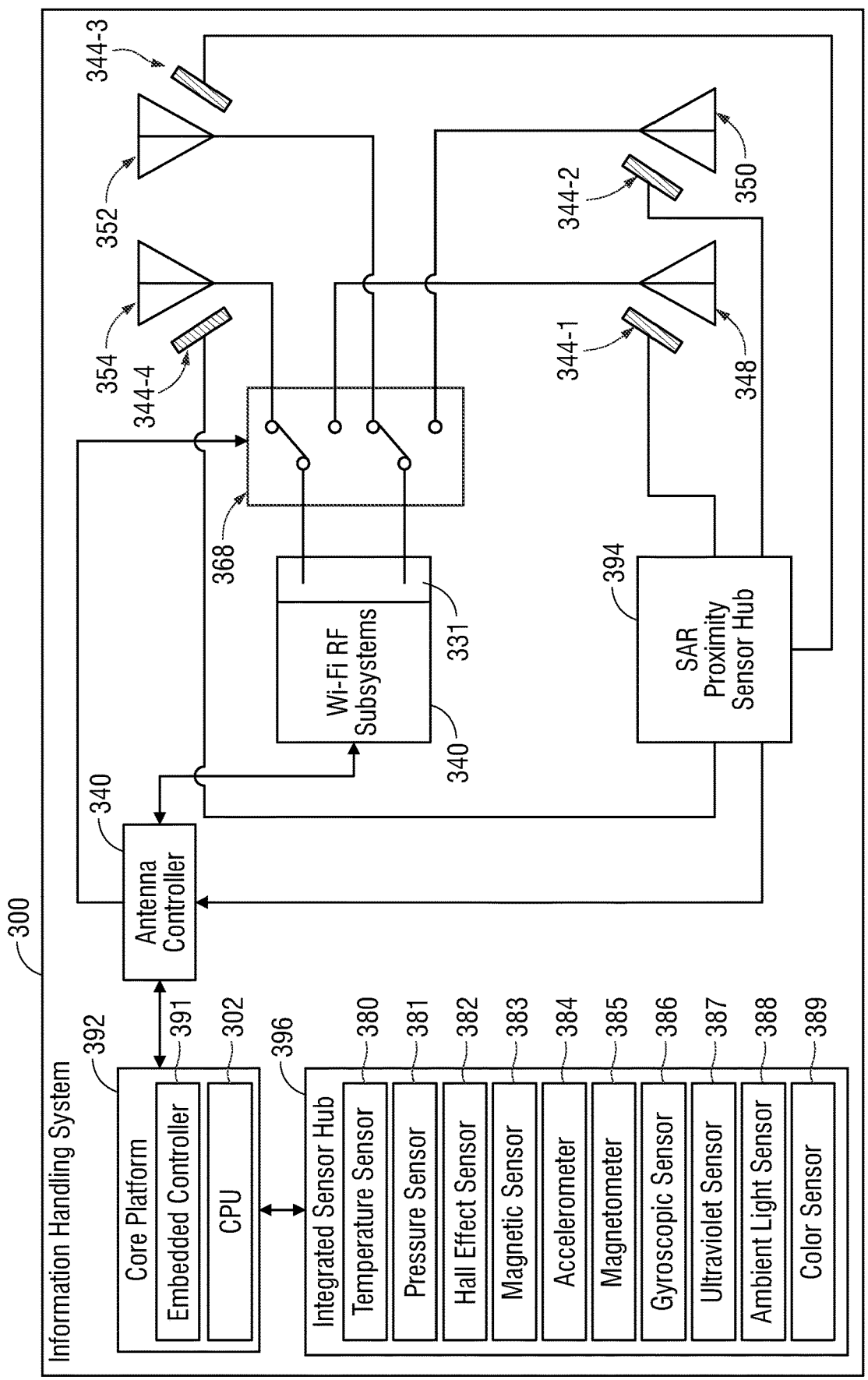
FIG. 3 is a block diagram illustrating a detailed portion of an information handling system according to another embodiment of the present disclosure.

FIG. 3 is a block diagram illustrating a detailed portion of an information handling system 300 according to another embodiment of the present disclosure. In this embodiment, the information handling system 300 may include similar components as those described in connection with FIG. 1 such as a processor, a PMU, a BIOS, an OS, various input/output devices, among other components.

The information handling system 300 may include an antenna controller 340 operatively coupled to, in this embodiment, four different antennas 348, 350, 352, 354. In the embodiments, a first antenna 348, a second antenna 350, a third antenna 352, and a fourth antenna 354 may each be associated with its own SAR proximity sensor 344-1, 344-2, 344-3, 344-4. The SAR proximity sensors 344-1, 344-2, 344-3, 344-4 associated with each of these antennas 348, 350, 352, 354 are used to determine SAR safety limitations as described herein as well as determine whether, for example, a user's body part is absorbing this RF electromagnetic radiation and, therefore, affecting the ability of the antennas 348, 350, 352, 354 from transmitting or receiving data.

In the embodiment shown in FIG. 3, the antenna controller 340 is associated with a number of RF subsystems 330. The Wi-Fi RF subsystems 330 may include any circuitry such as front ends, modems, protocol modules, amplifiers, filters, and tuners, among others that interfaces with antenna systems including each of the antennas 348, 350, 352, 354, and the antenna controller 340. The Wi-Fi RF subsystems 330 may also include a number of ports 331 used to operatively couple a plurality of antennas 348, 350, 352, 354 to the Wi-Fi RF subsystems 330. The Wi-Fi RF subsystems 330 may be part of the antenna controller 340 or may be separate circuits, such as integrated circuits on a wireless adapter in various embodiments. In this embodiment, the RF subsystems 330 may help to provide an oscillation current to be passed to the antennas 348, 350, 352, 354 to propagate a signal from the antennas 348, 350, 352, 354 at a specific frequency and under a particular wireless protocol (e.g., Wi-Fi, other WLAN protocol, or WWAN protocol). The RF subsystems 330 and the antenna controller 340 are operatively coupled to a switch 368 and the antennas 348, 350, 352, 354. In this embodiment, the switch 368 is one of a double pole, quadruple throw (DP4T) switch or two single pole, single throw (SP2T) switches. In a particular embodiment, the switch 368 may be a multiple port switch that allows a first RF subsystems 300 to be operatively coupled to any of the antennas 348, 350, 352, 354 different from the antennas 348, 350, 352, 354 operatively coupled to a second RF subsystem 330. In either embodiment, the switches 348 may operatively couple the RF subsystems 330 and antenna controller 340 to the four antennas 348, 350, 352, 354 in order to facilitate the N×N MIMO array configuration among a selection of antenna for the WLAN/wireless protocols that may be active on the information handling system 300 as described herein. The N×N MIMO array configurations may be those configurations as described in connection with the scenarios listed in Table 1 provided herein.

The information handling system 300 may further include a SAR proximity sensor hub 394. The SAR proximity sensor hub 394 may be used to accumulate all of the SAR data readings from each of the SAR proximity sensors 344 placed at each of the antennas 348, 350, 352, 354. Upon accumulation of this data, the SAR proximity sensor hub 394 may forward the SAR data onto the antenna controller 340 in order to be used to determine which of the antennas 348, 350, 352, 354 are to be used in the N×N MIMO WLAN array configuration. In an alternative embodiment, upon accumulation of this data, the SAR proximity sensor hub 394 may forward the SAR data onto the core platform 392 which then instructs the embedded controller to 391 distribute that data to the antenna controller 340. As described herein, RSSI data may also be retrieved from, for example, an intermediate-frequency (IF) amplifier used by the wireless interface adapter to raise or lower signal levels at the RF subsystems 330 by increasing or decreasing the power applied to each of the antennas 348, 350, 352, 354. If and when the RSSI drops, for example, the SAR data may also be cross-referenced to determine whether the drop in transmission is due to the presence of a human body or a drop in power provided to any given antenna 348, 350, 352, 354.

The information handling system 300 may also include an integrated sensor hub 396 operatively coupled to the embedded controller 390 via the core platform 392. The core platform 392 may include, in an embodiment, an embedded controller (EC) 391. The EC 391 may flash any software to be executed in order to operate and instruct the antenna controller 340 and other hardware within the information handling system 300 to perform the functions and methods described herein. In an embodiment, the antenna controller 340 may itself be an EC that is dedicated to the operations of the Wi-Fi RF subsystems 330 and associated hardware. The core platform 392 may also include a central processing unit (CPU) 302 or other processor to direct other operations of the information handling system 100 and to instruct the EC 391 to perform those functions as described herein. The CPU 302 and embedded controller 391 may be operatively coupled, via a data connection, to other hardware in the information handling system 300 as described herein.

The integrated sensor hub 396 operatively coupled to the core platform 392 may receive data from a plurality of sensors that help to provide data related to the configuration data and system operation and connection metrics described herein. The integrated sensor hub 396 may be operatively coupled to, for example, a temperature sensor 380, a pressure sensor 381, a Hall effect sensor 382, a magnetic sensor 383, an accelerometer 384, a magnetometer 385, a gyroscopic sensor 386, an ultraviolet sensor 387, an ambient light sensor 388, and a color sensor 389, among other sensors.

By way of example, the Hall effect sensor 382 may be used, in part, to determine the configuration of the information handling system 300. In this example, the Hall effect sensor 382 may detect a magnitude of a magnetic field produced by a magnet. Here, magnets or magnetic field sources may be placed at locations within the information handling system 300 to be detected by the Hall effect sensor 382 when the information handling system 300 is placed in certain configurations. For example, the Hall effect sensor 382 may be placed in a display chassis of a 360-degree-type laptop so as to be able to tell when the information handling system 300 is in a closed position by detecting the magnetic field of a magnet placed in a base chassis of the information handling system 300. Similarly, the Hall effect sensor 382 or a plurality of Hall effect sensors 382 may detect if and when the information handling system 300 is placed in an open configuration or tablet configuration. Also, a Hall effect sensor along with additional sensors such as a gyroscope and accelerometer may be used to detect that the information handling system 300 is in a dual tablet configuration, a laptop configuration, a tent mode configuration, a book configuration, as well as several other configurations described herein.

In the present specification, the accelerometer 384, magnetometer 385, gyroscopic sensor 386, and magnetic sensor 383 may also be used to determine an absolute position of the information handling system 300 relative to the earth and other removable portions (e.g., display chassis relative to removable base chassis) of the information handling system 300. The configuration data may also be determined using optic sensors such as the color sensor 389, ambient light sensor 388, and ultraviolet sensor 387. Each of these sensors may be placed in the body of the information handling system 300 in order to detect light emitted by a number of light sources also placed on the information handling system 300

The configuration data, when generated and received at the integrated sensor hub 396, may be provided to the antenna controller 340. Again, this configuration data may be used by the antenna controller 340 during execution of the antenna selection algorithm used to determine which of the antennas 348, 350, 352, and 354 are to be used in the N×N WLAN MIMO array configuration to avoid signal blockage or assist with enhanced line of sight lobe transmission/reception for high frequency protocols such as Wi-Fi 6 or 6E. Here, the information handling system 300 may switch the selection of located antennas within the base chassis of the information handling system in order to select the best two antennas for a 2×2 Wi-Fi MIMO antenna array when a high frequency/low penetration frequencies are being used. Because higher frequencies transmit and receive data at a relatively higher throughput the information handling system may prioritize for those networks and communication protocols that allow for these higher frequencies. In an embodiment, the information handling system 300 may enable the use of Wi-Fi 6 or 6E related frequencies with a dynamic, changeable set of antennas placed within a reconfigurable and mobile information handling system 300. The systems and methods described herein allow the information handling system 300 to pick the best two antennas for a 2×2

MIMO WLAN communication protocol or select other (un-related) antennas to be used as options or for a different, less active wireless protocol in some embodiments (e.g., WWAN). For example, the embodiments herein may allow for the antenna selection system to switch between spatially distinct antennas to provide a high-frequency protocol with high data bandwidth capacity and needs access to an improved line of sight for connectivity signals to an access point or basestation.

In an embodiment, the antenna controller 340 may also gather system operation and connection metrics as described herein. The system operation and connection metrics includes data descriptive of measured received RSSI at each of the antennas 348, 350, 352, 354 relating to signal quality and strength of any of each of a plurality of communication networks. The data obtained by the antenna controller 340 may be used during execution of the antenna selection algorithm 364 along with information on the spatial diversity of the locations of each antenna 348, 350, 352, 354 within the chassis of the information handing system 300. This may be done to determine which set of antennas to operatively couple the information handling system to for a WLAN protocol (and, in some embodiments, for a WWAN protocol at alternative antennas). As descried herein, the antenna controller 340, after establishing a sideband messaging protocol, may harvest this system operation and connection metrics in order to determine the current state of the networks to which the information handling system 300 may be coupled to as well as the status of those networks with regard to RSSI and other metrics relating to signal quality. In an embodiment, the sideband communication protocol may establish any wireless communication link with any wireless network apart from a concurrently initiated communication link. In an embodiment, the sideband communication link achieved via execution of the sideband serial messaging protocol may allow the antenna controller 340 to determine which wireless networks are available to operatively couple the information handling system 300 to a wireless network as well as any orientation, RSSI, system operation, and connection metrics associated with the antennas to be selected to establish wireless links with a wireless network.

Again, during operation, the antenna controller 340 may receive the SAR data, RSSI data, the configuration data, and system operation and connection metrics and provide this data as input at an antenna selection algorithm as described herein. In one embodiment, this antenna selection algorithm may be influenced by the data provided in table 1 in order to determine the N×N MIMO WLAN array configuration among the plurality of antennas 348, 350, 352, 354 based on spatial awareness of these antenna locations within the information handling system 300 (e.g., a base chassis of the information handling system).

In order to switch from a first set of antennas (e.g., first antenna 348 and third antenna 352) to a second set of antennas (e.g., second antenna 350 and fourth antenna 354) the embedded controller may be operatively coupled to the switch 348. In this embodiment, the antenna controller may provide antenna switching data describing which set from the operable antennas 348, 350, 352, 354 to use in order to operatively couple to the information handling system 300 to a network (e.g., WWAN, Wi-Fi, WLAN, etc.). Again, table 1 shows a plurality of example scenarios (e.g., rows 2, 3, 4, and 5 in the table) where the lid or display panel of the information handling system 300 is detected as either closed or open (e.g., orientation data). In a first scenario (e.g., as defined in row 2), for example, the lid is detected open. Here the first antenna 348 has a SAR proximity sensor 344-1 that provides input to the antenna controller 340 indicating, in this example, that a user's body is near the first antenna 348 and to avoid the use of the first antenna 348 for a primary protocol operating such as the WLAN protocol (e.g., Wi-Fi 6). The SAR proximity sensor 344-2 placed next to the second antenna 350, however, indicates that no part of the user's body (or any other object) is close to the second antenna 350 impacting the transmission or reception of data at the second antenna 350. The SAR proximity sensor 344-3 associated with the third antenna 352 may, similar to the first antenna 348, indicate that a user's body is near the third antenna 352 and to avoid the use of the third antenna 352. Additionally, in the first scenario the SAR proximity sensor 344-4 associated with the fourth antenna 354 indicates that the user's body is not near the fourth antenna 354. In this example scenario, for the purposes of Bluetooth and Wi-Fi communications (e.g., Wi-Fi 6e communications) under a 2×2 MIMO communication scenario, one of the antennas (e.g., antenna "A") used includes the fourth antenna 354 while another antenna used in the 2×2 MIMO includes the second antenna 350. Additionally, the antenna controller 340 may also receive the RSSI indicators, system operation and connection metrics from the antenna controller 340 executing a sideband serial messaging protocol, and configuration data descriptive of a configuration of the information handling system in order to determine the signal strength, line of sight, spatial location of the antennas 348, 350, 352, 354, and other real-time operational characteristics of each of the antenna 348, 350, 352, 354. With this information, the antenna selection algorithm (not shown) (some descriptive scenarios shown in Table 1, for example) may be been used by the antenna controller 340 to facilitate the N×N MIMO array configuration as described herein. Upon this determination to use the fourth antenna 354 and second antenna 350 according to the first scenario (row 2, Table 1), the antenna controller 340 may operate the switch 348 to switch from operating the first antenna 348 to operating the second antenna 350. Additionally, the embedded controller 348 may operate the switch 368 to switch from operating the third antenna 352 to operating the fourth antenna 354. Thus, four individual antennas (e.g., Wi-Fi, WLAN, WWAN) are switched based on execution of the algorithm to choose the best two antennas not in human proximity and which would provide the best operative connection to a network for a given active protocol.

The operation of the information handling system 300 and its antenna controller 340 allows for a MIMO WLAN selection using a spatial switched diversity scheme to select among antennas at diverse locations on the information handling system 300. The antenna selection logic mapping channel state information and proximity detection of each antenna may be used to enhance coverage while mitigating blockage in a closed loop fashion based on protocol type that is active, orientation of the information handling system 300, SAR detections, signal strength or quality, and other factors (e.g., types of data usage by applications being executed on the information handling system 300). The channel state information of the selected MIMO antennas as harvested from, for example, a WLAN radio via a sideband serial messaging protocol allows for the data to be gathered that may be used in part to dynamically switch from a first set of antennas to a second set of antennas.

Figure 4:
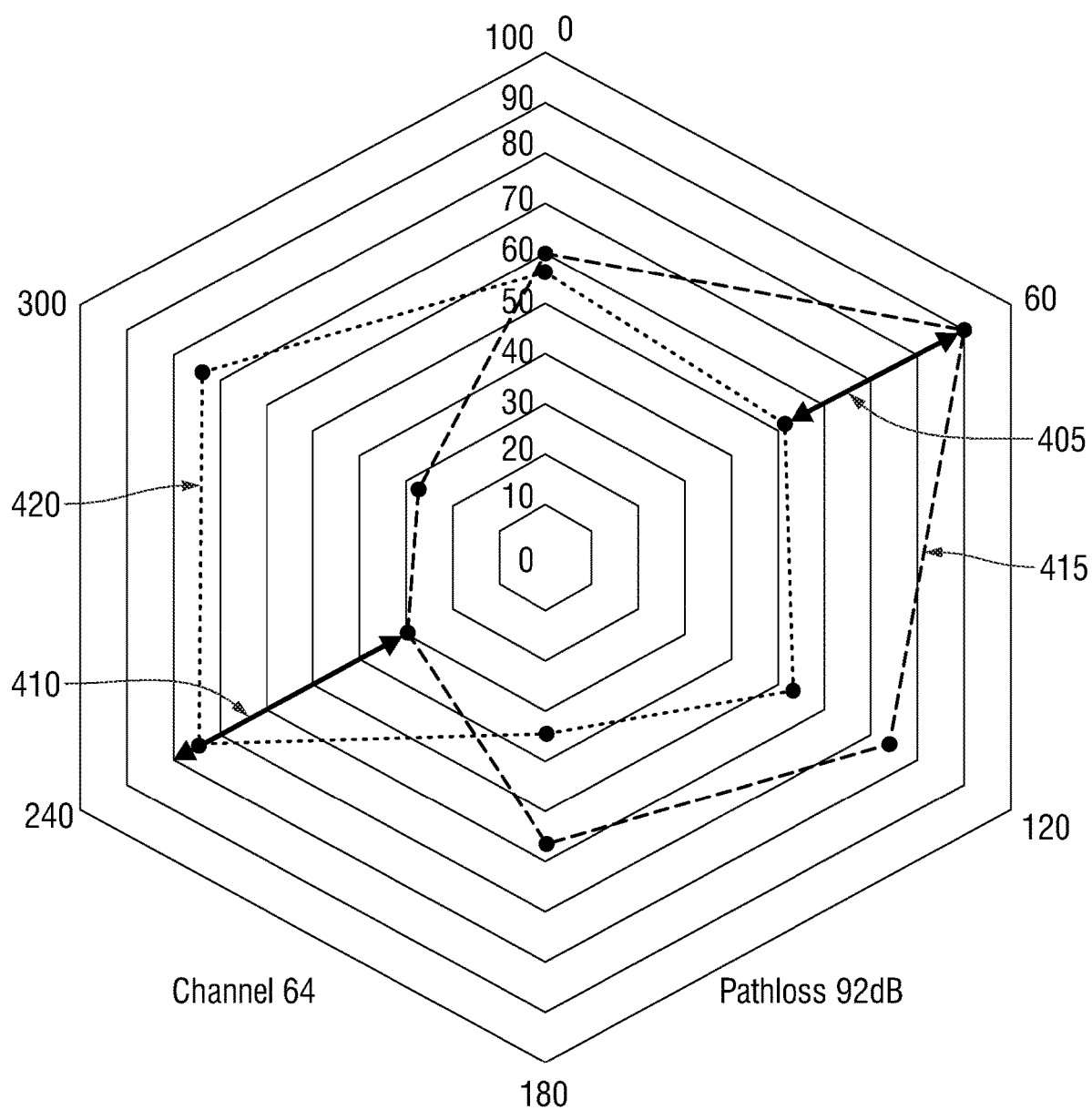
FIG. 4 is a graphical diagram illustrating a multiple-input and multiple-output (MIMO) transceiving coverage based on the switched spatial diversity systems and methods described herein according to an embodiment of the present disclosure.

FIG. 4 is a graphical diagram illustrating a multiple-input and multiple-output (MIMO) transceiving coverage based on the switched spatial diversity systems and methods described herein according to an embodiment of the present disclosure. The graphical diagram shows the MIMO transceiving coverage of a first antenna 420. This first antenna may, in this example, be an antenna located near a click pad within a base chassis of an information handling system. The graphical diagram also shows the MIMO transceiving coverage of a second antenna 415. The second antenna may be an antenna located in a hinge used to operatively couple the base chassis to the display chassis of the information handling system.

Because the first antenna and second antenna are operating under a 2×2 MIMO array configuration, the transceiving coverage has been expanded as indicated by two envelopes 410 and 405. Thus, by selecting those antennas having the highest signal strength and with the least amount of detected SAR or other blockage, such as due to the information handling system orientation relative to an access point, of the transmissions and receptions of data, the coverage of the N×N MIMO array configuration (e.g., 2×2 MIMO array configuration) is increased as shown by the envelopes 405 and 410 due to dynamic switching among spatially diverse antennas on the information handling system. This increase in transceiving coverage is exemplary to the switching from a first set of antennas to a second set of antennas based on the SAR data, the RSSI data, the system operation and connection metrics, and the configuration data provided as input into the antenna selection algorithm. However, it is appreciated that these two envelopes 410 and 405 may change as the SAR data, RSSI data, and the system operation and connection metrics, and the configuration data are updated periodically.

Figure 5:
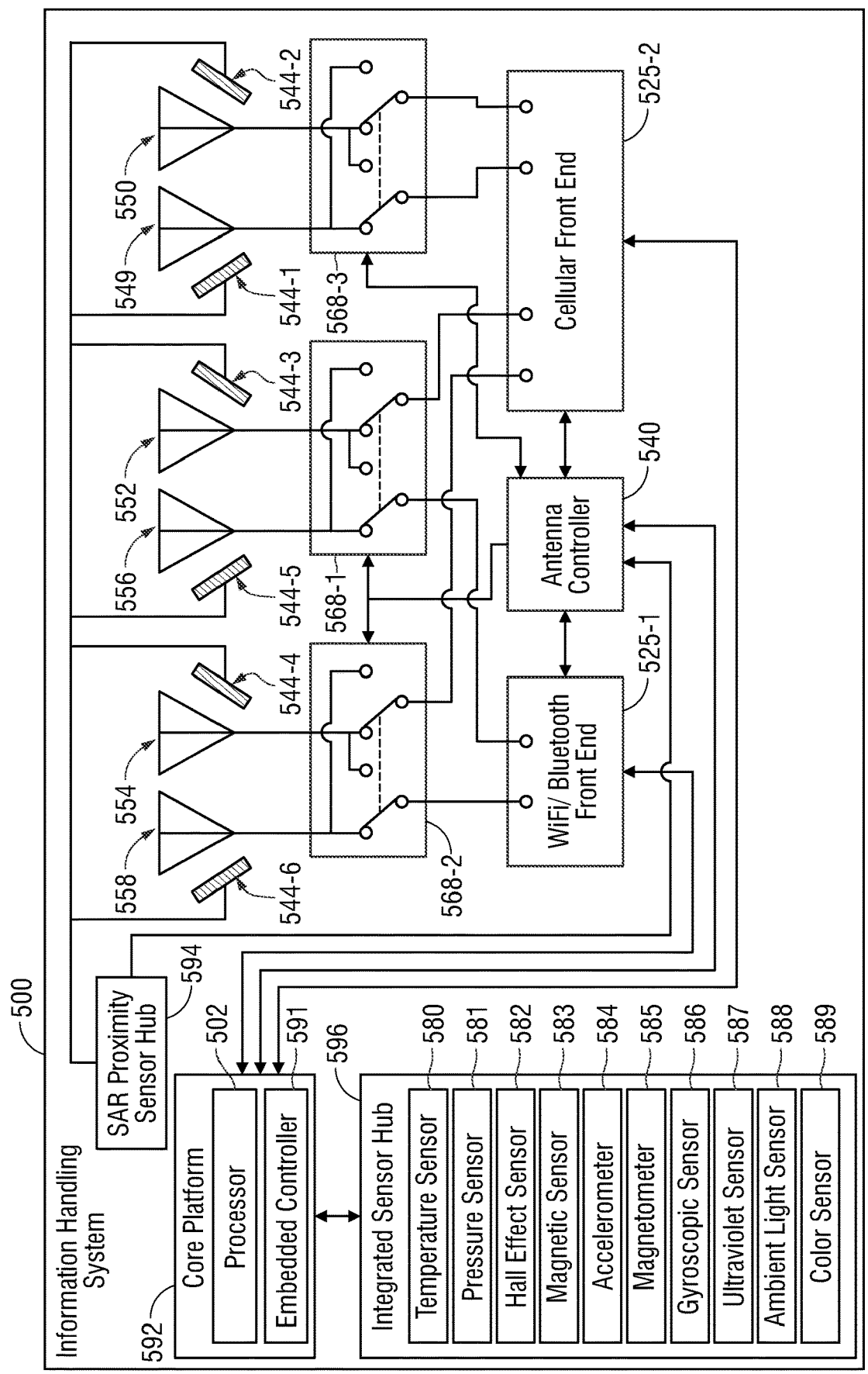
FIG. 5 is a block diagram illustrating a detailed portion of an information handling system according to yet another embodiment of the present disclosure.

FIG. 5 is a block diagram illustrating a detailed portion of an information handling system 500 according to yet another embodiment of the present disclosure. In this embodiment, the information handling system 500 may include similar components as those described in connection with FIG. 1 such as a processor, a PMU, a BIOS, an OS, various input/output devices, among other components.

The information handling system 500 may include an antenna controller 540 operatively coupled to, in this embodiment, six different antennas 548, 550, 552, 554, 556, 558. In the embodiments, a first antenna 548, a second antenna 550, a third antenna 552, and a fourth antenna 554, fifth antenna 556, and sixth antenna 558 may each be associated with its own SAR proximity sensor 544-1, 544-2, 544-3. 544-4, 544-5, 544-6. The SAR proximity sensors 544-1, 544-2, 544-3. 544-4, 544-5, 544-6 associated with each of these antennas 548, 550, 552, 554, 556, 558 are used to determine SAR safety limitations as described herein as well as determine whether, for example, a user's body part is absorbing this RF electromagnetic radiation and, therefore, affecting the ability of the antennas 548, 550, 552, 554, 556, 558 from transmitting or receiving data.

In the embodiment shown in FIG. 5, the antenna controller 540 is associated with a number of antenna front ends 525-1 and 525-2. The antenna front ends 525-1 and 525-2 may include any circuitry that interfaces with, for example, RF subsystems such as front ends, modems, protocol modules, amplifiers, filters, and tuners, among others that interfaces with antenna systems including each of the antennas 548, 550, 552, 554, 556, 558, and the antenna controller 540. RF subsystems may be part of the antenna controller 540 or may be separate circuits, such as integrated circuits on a wireless adapter in various embodiments. In this embodiment, the antenna front ends 525-1 and 525-2 may include a Wi-Fi/Bluetooth front end 525-1 and a cellular front end 525-2. Each of the antenna front ends 525-1 and 525-2 may cause an oscillation current to be passed to the antennas 548, 550, 552, 554, 556, 558 to propagate a signal from the antennas 548, 550, 552, 554, 556, 558 at a specific frequency. In an embodiment, the Wi-Fi/Bluetooth front end 525-1 may be operatively coupled to two antennas: a fifth antenna 556 and a sixth antenna 558. The Wi-Fi/Bluetooth front end 525 may be operatively coupled to the fifth antenna 556 via a first switch 568-1 and to the sixth antenna 558 via a second switch 568-2. In an embodiment, the cellular front end 525-2 may be operatively coupled to four antennas: a first antenna 548, a second antenna 550, a third antenna 552, and a fourth antenna 554. The cellular front end 525-2 is operatively coupled to the first antenna 548 and second antenna 550 via a third switch 568-3, to the third antenna 552 via the first switch 568-1, and to the fourth antenna 554 via the second switch 568-2. The antenna front ends 525-1 and 525-2 are operatively coupled to the antenna controller 540 as well to have their operatively coupled antennas 548, 550, 552, 554, 556, 558 switched according the operations of the information handling system 500 described herein.

In the embodiment shown in FIG. 5, a first switch 568-1 is a double pole, double throw (DPDT) switch. The second switch 568-2 may also be a DPDT switch. Additionally, the third switch 568-3 may be a DPDT switch. It is contemplated that other switch types or series of switch types may be used in other embodiments. The shown DPDT switch embodiment is for illustration. The first switch 568-1, second switch 568-2, and third switch 568-3 may operatively couple the antenna front ends 525-1 and 525-2 (e.g., the Wi-Fi/Bluetooth front end 525-1 and/or cellular front end 525-2) and antenna controller 540 to 2 or more of the six antennas 548, 550, 552, 554, 556, 558 in order to facilitate one or more N×N MIMO array configurations (e.g., WLAN MIMO array configuration and/or WWAN MIMO array configuration) as described herein. The N×N MIMO array configurations may be those configurations as described in connection with the scenarios listed in Table 2 provided herein, for example.

The information handling system 500 may further include a SAR proximity sensor hub 594. The SAR proximity sensor hub 594 may be used to accumulate all of the SAR data readings from each of the SAR proximity sensors 544-1, 544-2, 544-3, 544-4, 544-5, 544-6 placed at each of the antennas 548, 550, 552, 554, 556, 558. Upon accumulation of this data, the SAR proximity sensor hub 594 may forward the SAR data onto the antenna controller 540 or other embedded controller 591 or processor 502 in order to be used to determine which of the antennas 548, 550, 552, 554, 556, 558 are to be used in the N×N MIMO array configurations described herein. In an alternative embodiment, upon accumulation of this data, the SAR proximity sensor hub 594 may forward the SAR data onto the core platform 592 which then instructs the embedded controller to 591 distribute that data to the antenna controller 540.

The information handling system 500 may also include an integrated sensor hub 596 operatively coupled to the processor 591 via a core platform 592. The integrated sensor hub 596 may receive data from a plurality of sensors that help to provide data related to the configuration data and system operation and connection metrics described herein. The integrated sensor hub 596 may be operatively coupled to, for example, a temperature sensor 580, a pressure sensor 581, a Hall effect sensor 582, a magnetic sensor 583, an accelerometer 584, a magnetometer 585, a gyroscopic sensor 586, an ultraviolet sensor 587, an ambient light sensor 588, and a color sensor 589, among other sensors.

By way of example, the Hall effect sensor 582 may be used, in part, to determine the configuration of the information handling system 500. In this example, the Hall effect sensor 582 may detect a magnitude of a magnetic field produced by a magnet. Here, magnets or magnetic field sources may be placed at locations within the information handling system 500 to be detected by the Hall effect sensor 582 when the information handling system 500 is placed in certain configurations. For example, the Hall effect sensor 582 may be placed in a display chassis of a 360-degree-type laptop so as to be able to tell when the information handling system 500 is in a closed position by detecting the magnetic field of a magnet placed in a base chassis of the information handling system 500. Similarly, the Hall effect sensor 582 or a plurality of Hall effect sensors 582 may detect if and when the information handling system 500 is placed in an open configuration or a tablet configuration. Also, a Hall effect sensor along with additional sensors such as a gyroscope and accelerometer may be used to detect that the information handling system 500 is in a dual tablet configuration, a laptop configuration, a tent mode configuration, a book configuration, as well as several other configurations described herein.

In the present specification, the accelerometer 584, magnetometer 585, gyroscopic sensor 586, and magnetic sensor 583 may also be used to determine an absolute position of the information handling system 500 relative to the earth and other removable portions (e.g., display chassis relative to removable base chassis) of the information handling system 500. The configuration data may also be determined using optic sensors such as the color sensor 589, ambient light sensor 588, and ultraviolet sensor 587. Each of these sensors may be placed in the body of the information handling system 500 in order to detect light emitted by a number of light sources also placed on the information handling system 500.

The configuration data, when generated and received at the integrated sensor hub 596, may be provided to the antenna controller 540. Again, this configuration data may be used by the antenna controller 540 during execution of the antenna selection algorithm used to determine which of the antennas 548, 550, 552, 554, 556, 558 are to be used in, for example, the N×N WWAN MIMO array configurations and WLAN MIMO array configuration. This may be done to avoid signal blockage or assist with enhanced line of sight lobe transmission/reception for high frequency protocols such as Wi-Fi 6 or 6E concurrently with any WWAN protocols. Here, the information handling system 500 may switch the selection of located antennas within the base chassis of the information handling system in order to select the best two antennas for a 2×2 Wi-Fi MIMO antenna array, a 4×4 WWAN MIMO array, or any other N×N MIMO antenna array configuration when a high frequency/low penetration frequencies are being used. Because higher frequencies transmit and receive data at a relatively higher data throughput the information handling system may prioritize for those networks and communication protocols that allow for these higher frequencies. However, these higher frequencies have less range or penetration and benefit from spatial antenna location and lobe directionality with respective APs or base stations of the wireless protocol utilizing higher radiofrequencies. In an embodiment, the information handling system 500 may enable the use of Wi-Fi 6 or 6E related frequencies and 5G related frequencies (e.g., 5 GHz, 6 GHz) with a dynamic, changeable set of antennas placed within a reconfigurable and mobile information handling system 500. The systems and methods described herein allow the information handling system 500 to pick the best two antennas for a 2×2 MIMO WLAN communication protocol and select other (un-related) antennas to be used as options or for a different, less active wireless protocol in some embodiments (e.g., WWAN).

In an embodiment, the antenna controller 540 may also gather system operation and connection metrics as described herein. The system operation and connection metrics includes data descriptive of measured RSSI levels at each of the antennas 548, 550, 552, 554, 556, 558, and other metrics relating to signal quality and strength of any of each of a plurality of communication networks. The data obtained by the antenna controller 540 may be used during execution of the antenna selection algorithm 564 along with information on the spatial diversity of the locations of each antenna 548, 550, 552, 554, 556, 558 within the chassis of the information handling system 500. This may be done to determine which set of antennas to operatively couple the information handling system for a WLAN protocol (and, in some embodiments, for a WWAN protocol at alternative antennas). As descried herein, the antenna controller 540, after establishing a sideband messaging protocol, may harvest this system operation and connection metrics in order to determine the current state of the networks to which the information handling system 500 may be coupled to as well as the status of those networks with regard to the RSSI values and other metrics relating to signal quality. In an embodiment, the sideband communication protocol may establish any wireless communication link with any wireless network apart from a concurrently initiated communication link. In an embodiment, the sideband communication link achieved via execution of the sideband serial messaging protocol may allow the antenna controller 540 to determine which wireless networks are available to operatively couple the information handling system 500 to a wireless network as well as any orientation, RSSI, system operation, and connection metrics associated with the antennas 548, 550, 552, 554, 556, 558 to be selected to establish wireless links with a wireless network.

Again, during operation, the antenna controller 540 may receive the SAR data, the RSSI data, the configuration data, and system operation and connection metrics and provide this data as input at an antenna selection algorithm as described herein. In one embodiment, this antenna selection algorithm may be influenced by the data provided in table 2 in order to determine the N×N WLAN MIMO array configuration and N×N WWAN MIMO array configuration to be formed among the plurality of antennas 548, 550, 552, 554, 556, 558 based on spatial awareness of these antenna locations within the information handling system 500 (e.g., a base chassis of the information handling system). Again, in an embodiment, a determination as to what wireless protocol to operate the antennas 548, 550, 552, 554, 556, 558 under may be based on the type of application being executed on the information handling system along with the data throughput used to communicate with resources located on a wireless network (WWAN wireless network or WLAN wireless network). This additional information may be provided to determine how to, if, and when to switch any antenna 548, 550, 552, 554, 556, 558 to operate under a different wireless protocols. For example, where a user is engaged in an online gaming system that requires relatively high data transmission to and from the information handling system 500 to a network, a 5G WWAN wireless protocol may be used and the antennas 548, 550, 552, 554, 556, 558 devoted to the N×N WWAN MIMO array configuration transmissions may be accordingly repurposed to achieve the relatively higher level of data transmission. However, where an email application is being executed, the number of antennas 548, 550, 552, 554, 556, 558 devoted to the execution of a WWAN protocol may be reduced.

In order to switch from a first set or sets of antennas (e.g., a third antenna 552 and a fourth antenna 554) to a second set or sets of antennas (e.g., a fifth antenna 556 and sixth antenna 558), the embedded controller may be operatively coupled to each of the switches 568-1, 568-2, 568-3. In this embodiment, the antenna controller 540 may provide antenna switching data describing which set of the operable antennas 548, 550, 552, 554, 556, 558 to use in order to operatively couple to the information handling system 500 to a network (e.g., WWAN, Wi-Fi, WLAN, etc.). Again, Table 2 shows six different scenarios related to the operation of a plurality of antennas 548, 550, 552, 554, 556, 558 within the information handling system 500. In this embodiment, these antennas 548, 550, 552, 554, 556, 558 may be switched between use in order to facilitate a N×N WLAN MIMO array configuration or N×N WWAN MIMO array configuration transmissions and receptions as described herein. In a specific embodiment, with the execution of the antenna selection algorithm 564 (some descriptive scenarios shown in Table 2), two antennas out of the third antenna 552, fourth antenna 554, fifth antenna 556, and sixth antenna 558 in the information handling system 500 may be selectively re-purposed as either two WWAN antennas, making it a four-antenna switched diversity to select the best 4×4 WWAN MIMO antenna configuration. In this embodiment, any remaining antennas not repurposed for the 4×4 WWAN MIMO array configuration may be used for a 2×2 WLAN MIMO array configuration. The repurposing of the third antenna 552, fourth antenna 554, fifth antenna 556, and sixth antenna 558 may be accomplished via the number of switches 568-1, 568-2, 568-3 operated by the antenna controller 540 switching from one technology to another upon the determination as to which of these antennas are to be used for the transceiving and reception of data under the N×N MIMO array configurations. In alternative embodiments, a main WWAN antenna (e.g., first antenna 548) may be swapped with another WWAN antenna (e.g., second antenna 550) to act as the main WWAN antenna.

In an example embodiment hardware configuration, the fifth antenna 556 may be a WLAN antenna operatively coupled to the Wi-Fi/Bluetooth front end 525-1 while the third antenna 552 is a WWAN high band MIMO antenna operatively coupled to a cellular front end 525-2. These two antennas (e.g., third antenna 552 and fifth antenna 556) may be swapped between being used as a WLAN antenna or a WWAN antenna based on the operation of the first switch 568-1 by the antenna controller 540. In this embodiment, the fifth antenna 556 and third antenna 552 may be operatively coupled to a first cross bar, double pole, double throw (DPDT) switch 568-1. Additionally, the sixth antenna 558 may be purposed as a WLAN antenna while the fourth antenna 554 is purposed as a WWAN high band MIMO antenna. These two antennas (e.g., fourth antenna 554 and sixth antenna 558) may be swapped between being used as a WLAN antenna or a WWAN antenna based on the operation of the second switch 568-2 by the antenna controller 540. The sixth antenna 558 and fourth antenna 554 may be operatively coupled to a second cross bar, DPDT switch 568-2. Further, the first antenna 548 may be a WWAN main antenna while the second antenna 550 is a WWAN auxiliary (Aux) antenna. The first antenna 548 and second antenna 550 may be operatively coupled to a third cross bar DPDT switch 568-3 operated by the antenna controller 540.

In light of this example hardware configuration, a first scenario (row 3, Table 2) indicates that the antenna front ends 525-1 and 525-2, as indicated by the antenna controller 540, are to operate the antennas 548, 550, 552, 554, 556, 558 under a current WWAN 5G and WLAN operation based on concurrent state telemetry from a number of WWAN and WLAN antenna systems (e.g., cellular front end 525-2 and/or Wi-Fi/Bluetooth front end 525-1). As described herein, the antenna systems used, channels communicating over, signal telemetry inputs received from the WWAN and WLAN antenna systems operating, spatial diversity of the antennas 548, 550, 552, 554, 556, 558 within the information handling system 500, and signal strength indications (e.g., RSSI) across the WWAN and WLAN antennas 548, 550, 552, 554, 556, 558 may be detected and provided to the antenna controller 540. In an embodiment, a preliminary mapping of any associated 4×4 WWAN antennas (e.g., first antenna 548, second antenna 550 as well as the third antenna 552 or fifth antenna 556 and fourth antenna 554 or sixth antenna 558) available at the information handling system may indicate that, for example, first through fourth antennas 548, 550, 552, 554 are mapped as the 4×4 WWAN array configuration and a fifth antenna 556 and sixth antenna 558 are mapped as a 2×2 WLAN antenna configuration.

In the first scenario, the SAR sensor 544-1, 544-2, 544-3, 544-4, 544-5, 544-6 associated with any of the antennas 548, 550, 552, 554, 556, 558, respectively, have not indicated that any parts of the user's body (or any RF absorbing objects) are present around any of the antennas 548, 550, 552, 554, 556, 558 (e.g., "none" indicator in table 2, row 3, column 4). In this example scenario, the lid or display panel of the information handling system 500 is in an open state as indicated by the sensors used to determine the configuration data described herein. Because the lid or display chassis of the information handling system 500 may interfere with the transception of any of the antennas 548, 550, 552, 554, 556, 558, the configuration of the information handling system 500 may be considered when deciding which antennas 548, 550, 552, 554, 556, 558 are to be used to create any of the N×N WLAN MIMO array configurations or N×N WWAN MIMO array configurations. In this embodiment, a plurality of sensors may be operatively coupled to an integrated sensor hub 596. These sensors may include, among others, a temperature sensor 580, a pressure sensor 581, a hall effect sensor 582, a magnetic sensor 583, an accelerometer 584, a magnetometer 585, a hinge sensor, a light sensor (e.g., ultraviolet light sensor 587, ambient light sensor 588), a camera, and a color sensor 589. Each of these sensors may be used to detect the specific orientation of the information handling system 500 at any time including the location of the information handling system 500 relative to an access point or base station and whether the display chassis (e.g., lid) of the information handling system is in a closed or open position.

In this example scenario (scenario 1, row 3, table 2), the antenna controller 540 may toggle the first DPDT switch 568-1 and the second DPDT switch 568-2 to cross over the pair of WWAN high-band MIMO antenna signals to the WLAN antennas and visa versa with the WLAN antenna signals to the WWAN HB MIMO antennas. While doing so, the antenna controller 540 is provided with signal strength data associated with the operation of each of the WWAN high-band (HB) MIMO antennas (e.g., first antenna 548 and second antenna 550) as well as the WLAN antennas (e.g., fifth antenna 556 and sixth antenna 558) in a closed loop fashion. In this embodiment scenario, the antenna controller 540 selects the best 2×2 WLAN MIMO antenna and maps it to the Wi-Fi/Bluetooth front end 525-1 associated with WLAN data transmissions and receptions. Because the radio signal strength associated with the repurposable WLAN/WWAN diversity antennas (e.g., third antenna 552 and fourth antenna 554) is not as strong as the originally associated WLAN MIMO antennas (e.g., fifth antenna 556 and sixth antenna 556), the antenna controller 540 may leave the original antenna mapping unchanged. It is noted that some antennas may be mapped to operate as transmit/receive antennas (TRx) while others are mapped as antennas that are receiving antennas only (Rx) although they may be either WLAN antennas or WWAN antennas.

The first scenario (row three, table 2), the first antenna 548 and third antenna 552 may operate as dual transmitting antennas during their 5G WWAN operating states. This dual operation of the first antenna 548 and third antenna 552 support E-UTRAN new radio (EN-DC) operations. Additionally, the fifth antenna 556 and the sixth antenna 558 may operate as dual transmit WLAN MIMO antennas. In these embodiments, the antenna controller 540 may continue to monitor the signal strength across all antennas 548, 550, 552, 554, 556, 558 periodically in a closed-loop fashion and may re-assign or re-purpose and map the antennas 548, 550, 552, 554, 556, 558 based on any updated SAR data, RSSI data, system operation and connection metrics, and configuration data as described herein.

As a further example, Table 2 provides additional scenarios of which a second scenario (4$^{th}$ row, Table 2) is one of them. In this scenario, a preliminary mapping of the antennas 548, 550, 552, 554, 556, 558 have the first antenna 548, the second antenna 550, the fourth antenna 554, and the fifth antenna 556 grouped together to form a 4×4 WWAN MIMO configuration. Additionally, the third antenna 552 and sixth antenna 558 are grouped together to form a 2×2 WLAN operating configuration. As described herein, the fifth antenna 556 and the third antenna 552 are connected together via a first cross bar DPDT switch 568-1. The sixth antenna 558 and the fourth antenna 554 are operatively coupled together via a second cross bar DPDT switch 568-2. The first antenna 548 operating as the main WWAN antenna and the second antenna 550 operating as an auxiliary WWAN antenna are operatively coupled together at a third cross bar DPDT switch 568-3.

In this second scenario, the SAR data, RSSI data, system operation and connection metrics, and configuration data are also provided to direct the re-purposing of the individual antennas 548, 550, 552, 554, 556, 558 as described herein. In this embodiment, telemetry data along with other data from a plurality of SAR sensors 544-1, 544-2, 544-3, 544-4, 544-5, 544-6 (e.g., accumulated at the SAR proximity sensor hub 594) may indicate that, at the first antenna 548 and fifth antenna 556, a user's body or other RF-absorbing material is close to these antennas and this information is sent to the antenna controller 540.

Because the first antenna 548 is originally set to be the primary (e.g., main) transceiving WWAN antenna and because the first SAR sensor 544-1 indicates the presence of the user's body, the antenna controller 540 activates the third cross bar DPDT switch 568-3 (e.g., best antenna selection (BAS) switch) thereby mapping the second antenna 550 (formerly mapped as an auxiliary WWAN antenna) as the primary WWAN transceiving (TRx) antenna. The fifth antenna 556, in this scenario, was initially the primary WLAN transceiving (TRx) antenna and the first cross bar DPDT switch 568-1 is activated by the antenna controller 540 to map the third antenna 552 (previously a WWAN HB MIMO antenna) as one of the WLAN MIMO transceiving antennas. Further, according to this scenario, the antenna controller 540 may be allowed to toggle the second cross bar DPDT switch 568-2 to switch, dynamically, from the fourth antenna 554 to the sixth antenna 558 and visa-versa after the RSSI data and other telemetry data has been detected at those antennas. In this embodiment, because the fourth antenna 554 signal strength is relatively weaker that the originally assigned sixth antenna 558, the antenna controller 540 leaves the mapping of the sixth antenna 558 as a WLAN MIMO transceiving antenna.

The operation of the information handling system 500 and its antenna controller 540 allows for a N×N WLAN MIMO array selection using a spatial switched diversity scheme. The antenna selection logic mapping channel state information and proximity detection of each antenna may be used to enhance coverage while mitigating blockage in a closed loop fashion. The channel state information of the selected MIMO antennas as harvested from, for example, a WLAN radio via a sideband serial messaging protocol allows for the data to be gathered in order to dynamically switch from a first set of antennas to a second set of antennas.

Figure 6A:
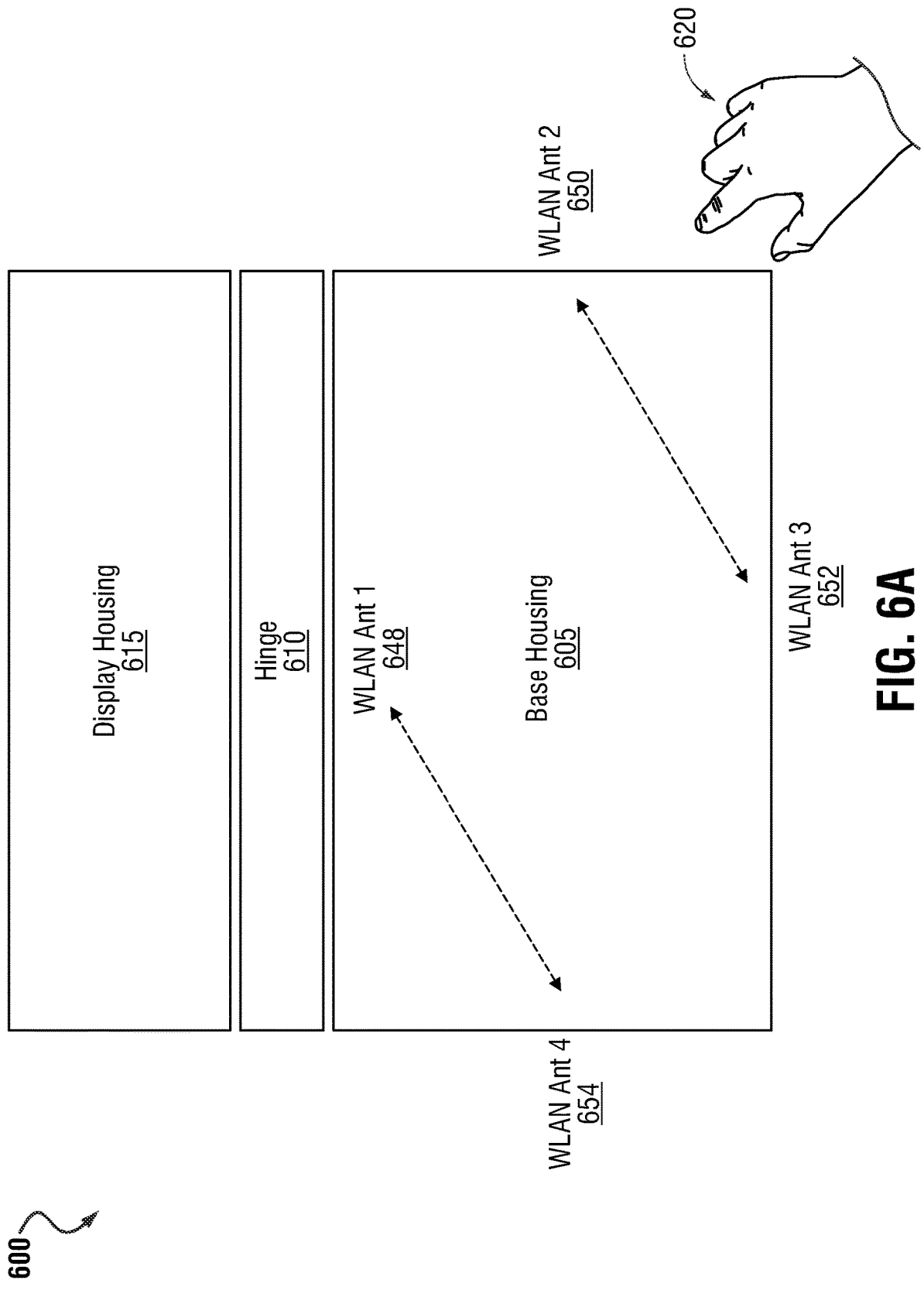
FIG. 6A is a block diagram illustrating an information handling system including a plurality of antennas according to another embodiment of the present disclosure.

FIG. 6A is a block diagram illustrating an information handling system 600 including a plurality of antennas according to an embodiment of the present disclosure. The block diagram illustrates a laptop-type information handling system such as a 360-degree convertible laptop. The information handling system 600, in this embodiment, includes a display housing 615. The display housing may include a back chassis as well as side walls or, optionally, a bezel used to secure a display device to that back chassis. In a specific embodiment, because the size of the display is increased, a bezel may not be present and the display device may be directly coupled to the back chassis of the display housing 615 without the use of a bezel. It is due to this increased display size that the antennas 648, 650, 652, 654 are moved into the base housing 605.

The information handling system 600, as described, includes a base housing 605. The base housing 605 may be operatively coupled to the display housing 615 via a hinge 610. In an embodiment, the hinge 610 may allow a back chassis of the base housing 605 to lay flat against the back housing of the display housing 615. In this embodiment, the hinge 610 may also allow the video display of the display housing 615 to lay flat against a keyboard formed into the base housing 605 thereby placing the information handling system 600 in a closed orientation as described herein. In an embodiment, the hinge 610 allows the display housing 615 to be selectively removed from the base housing 605. Once detached, the display housing 615 may be reversed and recoupled to the hinge 610 such that, in one orientation, the keyboard formed in the base housing 605 lays flat against the back chassis of the display housing 615 (e.g., modified tablet orientation). Other orientations of the information handling system 600 are contemplated as described herein.

As described, due to the increase in the size of the display within the display housing, the WLAN antennas 648, 650, 652, 654 may be placed within the base portion of the information handling system 600. FIG. 6A shows that these antennas 648, 650, 652, 654 are placed within the base housing 605. However, due to this placement, a user's body parts (e.g., the hand of the user 620), configuration of the information handling system 600, and the orientation of the information handling system 600 relative to an access point or base station, the user's hand 620, parts of the information handling system 600, and other objects may interfere with the transmissions and receptions of data of the antennas 648, 650, 652, 654. The antenna controller (e.g., 140 FIG. 1) may accommodate for this by executing the antenna selection algorithm as described and partially defined in Table 1 herein. Indeed, the antenna selection algorithm, when executed by the antenna controller, accommodates for SAR interferences by a user's body, poor system operation and connection metrics, RSSI data received at the antenna controller, and changes to the configuration of the information handling system 600. This is done by using accumulated data from the sensors described herein in order to receive SAR data, RSSI data, system operation and connection metrics, and configuration data as input into the antenna selection algorithm. The antenna controller may then provide, as output, a decision as to which of a plurality of antennas 648, 650, 652, 654 to use in order to operate in one or more N×N MIMO array configurations. The execution of this antenna selection algorithm is described in detail in connection with FIG. 1 and specifically in connection with FIG. 3. Based on the layout of the individual antennas 648, 650, 652, 654 within the base housing 605 as well as this accumulated data, the best pair or pairs of antennas 648, 650, 652, 654 may be determined to operate in the N×N MIMO array configuration thereby increasing the efficiency in the operation of the information handling system. In an embodiment, the N×N MIMO array configuration may be a 2×2 WLAN MIMO array configuration. In an embodiment, the N×N MIMO array configuration may be a 4×4 WLAN MIMO array configuration. The execution of the processes described herein also increase user satisfaction by optimizing the communication links to any of a plurality of networks available to the information handling system and increasing the data throughput to and from the information handling system 600 when, for example, high data bandwidth applications are being executed on the information handling system 600.

FIG. 6A also shows a number of dashed antenna repurposing lines indicating example scenarios depicted in Table 1. In this embodiment, the first scenario in Table 1 is depicted where, when the SAR data, RSSI data, system operation and connection metrics, and configuration data descriptive of a configuration of the information handling system 600 indicates that these antennas should be repurposed or swapped. For example, in the first scenario in Table 1, the SAR data, RSSI data and configuration data indicates that it would be best to switch from the first antenna 648 to the fourth antenna 654. This scenario also indicates that, due to the SAR data, RSSI data, and configuration data that the data transmissions presented at the third antenna 652 should be switched to the second antenna 650. Because the various types of data that are received at the antenna controller (e.g., the changing SAR data, RSSI data, configuration and orientation data, and the telemetry data) may be dynamically changing over time, as the data changes, the use of each of the first antenna 648, second antenna 650, third antenna 652, and fourth antenna 654 to form a 2×2 WLAN MIMO array configuration or the 4×4 WLAN MIMO array configuration may change over time as well.

Figure 6B:
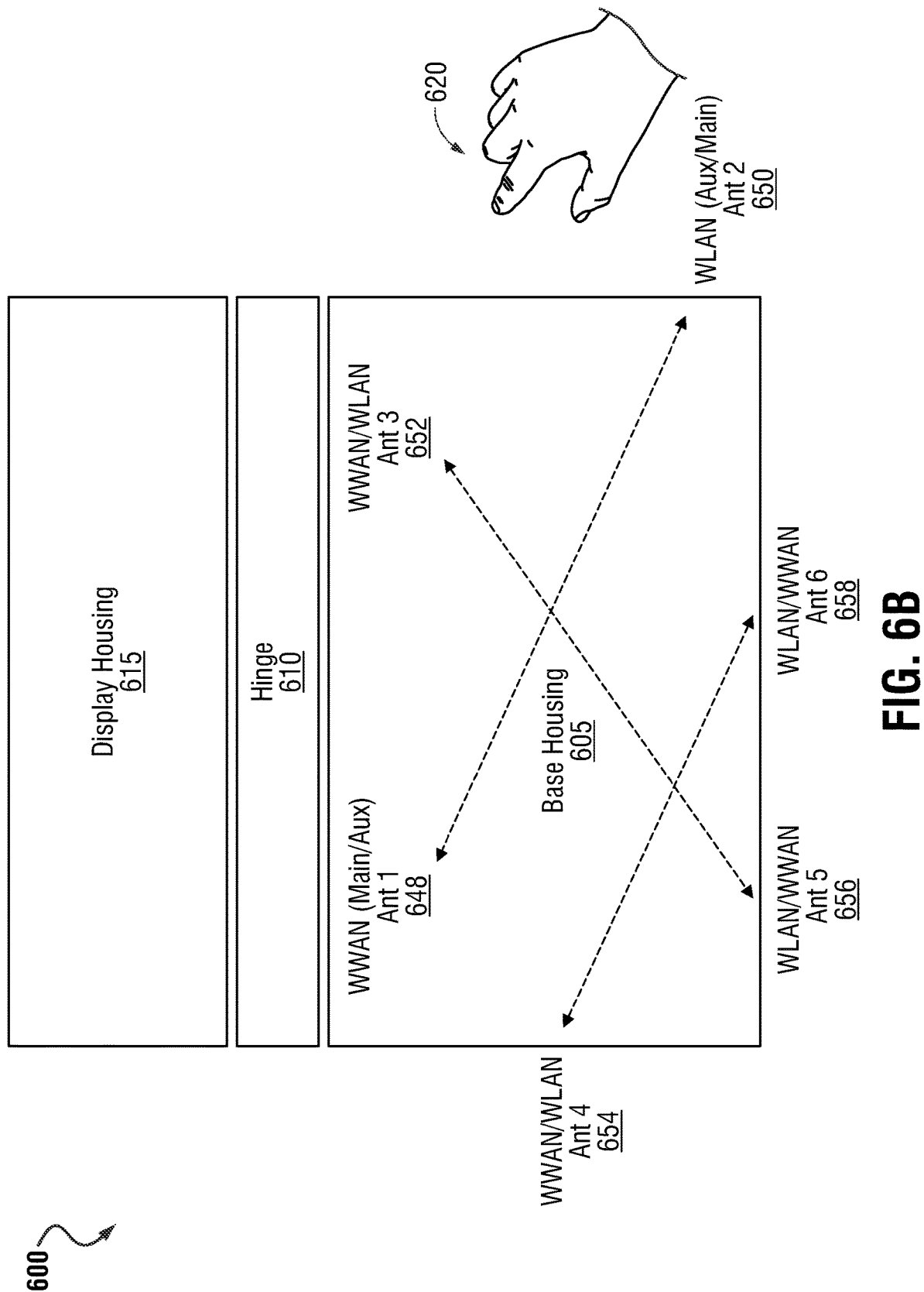
FIG. 6B is a block diagram illustrating an information handling system including a plurality of antennas according to yet another embodiment of the present disclosure.

FIG. 6B is a block diagram illustrating an information handling system 600 including a plurality of antennas according to another embodiment of the present disclosure. The block diagram illustrates a laptop-type information handling system such as a 360-degree convertible laptop. The information handling system 600, in this embodiment, includes a display housing 615. The display housing may include a back chassis as well as side walls or, optionally, a bezel used to secure a display device to that back chassis. In a specific embodiment, because the size of the display is increased, a bezel may not be present and the display device may be directly coupled to the back chassis of the display housing 615 without the use of a bezel. It is due to this increased display size that the antennas 648, 650, 652, 654, 656, 658 are moved into the base housing 605.

The information handling system 600, as described, includes a base housing 605. The base housing 605 may be operatively coupled to the display housing 615 via a hinge 610. In an embodiment, the hinge 610 may allow a back chassis of the base housing 605 to lay flat against the back housing of the display housing 615. In this embodiment, the hinge 610 may also allow the video display of the display housing 615 to lay flat against a keyboard formed into the base housing 605 thereby placing the information handling system 600 in a closed orientation as described herein. In an embodiment, the hinge 610 allows the display housing 615 to be selectively removed from the base housing 605. Once detached, the display housing 615 may be reversed and recoupled to the hinge 610 such that, in one orientation, the keyboard formed in the base housing 605 lays flat against the back chassis of the display housing 615 (e.g., modified tablet orientation). Other orientations of the information handling system 600 are contemplated as described herein.

As described, due to the increase in the size of the display within the display housing, the antennas 648, 650, 652, 654, 656, 658 may be placed within the base portion of the information handling system 600. FIG. 6B indicates that the first antenna 648 initially serves as the main WWAN antenna but may be switched with the second antenna 650 to be an auxiliary WWAN antenna. Additionally, FIG. 6B indicates that the second antenna 650 initially serves as the auxiliary WWAN antenna but may be switched with first antenna 648 to be the main WWAN antenna. The third antenna 652, fourth antenna 654, fifth antenna 656, and sixth antenna 658 may each be selectively repurposed to operate as either a WLAN antenna or a WWAN antenna and may form part of either a N×N WLAN MIMO array configuration or a N×N WWAN MIMO array configuration where N may equal 2 or 4.

FIG. 6B shows that these antennas 648, 650, 652, 654, 656, 658 are placed within the base housing 605. However, due to this placement, a user's body parts (e.g., the hand of the user 620), configuration of the information handling system 600, and the orientation of the information handling system 600 relative to an access point or base station, the user's hand 620, parts of the information handling system 600, and other objects may interfere with the transmissions and receptions of data of the antennas 648, 650, 652, 654, 656, 658. The antenna controller (e.g., 140 FIG. 1) may accommodate for this by executing the antenna selection algorithm as described and partially defined in Table 2 herein. Indeed, the antenna selection algorithm, when executed by the antenna controller, accommodates for SAR interferences by a user's body, poor system operation and connection metrics, RSSI data received at the antenna controller, and changes to the configuration of the information handling system 600. This is done by using accumulated data from the sensors described herein in order to receive SAR data, RSSI data, system operation and connection metrics, and configuration data as input into the antenna selection algorithm. The antenna controller may then provide, as output, a decision as to which of a plurality of antennas 648, 650, 652, 654, 656, 658 to use in order to operate in one or more N×N MIMO array configurations (WLAN and/or WWAN). The execution of this antenna selection algorithm is described in detail in connection with FIG. 1 and specifically in connection with FIG. 5. Based on the layout of the individual antennas 648, 650, 652, 654, 656, 658 within the base housing 605 as well as this accumulated data, the best pair or pairs of antennas 648, 650, 652, 654, 656, 658 may be determined to operate in the N×N MIMO array configuration thereby increasing the efficiency in the operation of the information handling system 600. In an embodiment, the N×N MIMO array configuration may be a 2×2 WLAN MIMO array configuration. In an embodiment, the N×N MIMO array configuration may be a 4×4 WWAN MIMO array configuration. The execution of the processes described herein also increase user satisfaction by optimizing the communication links to any of a plurality of networks available to the information handling system and increasing the data throughput to and from the information handling system 600 when, for example, high data bandwidth applications are being executed on the information handling system 600.

FIG. 6B also shows a number of dashed antenna repurposing lines indicating example scenarios depicted in Table 2. In this embodiment, the first scenario in Table 2 is depicted where, when the SAR data, RSSI data, system operation and connection metrics (e.g., telemetry data), and configuration data descriptive of a configuration of the information handling system 600 indicates that these antennas should be repurposed or swapped. For example, the antenna front ends (e.g., 525-1 and 525-2 FIG. 5), as indicated by the antenna controller, are to operate the antennas 648, 650, 652, 654, 656, 658 under a current WWAN 5G and WLAN operation based on concurrent state telemetry from a number of WWAN and WLAN antenna systems (e.g., Table 2, third row scenario). As described herein, the antenna systems used, channels communicating over, signal telemetry inputs received from the WWAN and WLAN antenna systems operating, spatial diversity of the antennas 648, 650, 652, 654, 656, 658 within the information handling system 600, and signal strength indications (e.g., RSSI) across the WWAN and WLAN antennas 648, 650, 652, 654, 656, 658 may be detected and provided to the antenna controller. In an embodiment, a preliminary mapping of any associated 4×4 WWAN antennas (e.g., first antenna 648, second antenna 650 as well as the third antenna 652 or fifth antenna 656 and fourth antenna 654 or sixth antenna 658) available at the information handling system may indicate that, for example, first through fourth antennas 648, 650, 652, 654 are mapped as the 4×4 WWAN MIMO array configuration and a fifth antenna 656 and sixth antenna 658 are mapped as a 2×2 WLAN antenna configuration.

In the first scenario, the SAR sensor associated with any of the antennas 648, 650, 652, 654, 656, 658 have not indicated that any parts of the user's body (or any RF absorbing objects) are present around any of the antennas 648, 650, 652, 654, 656, 658 (e.g., "none" indicator in table 2, row 3, column 4). In this example scenario, the lid or display panel of the information handling system 600 is in an open state as indicated by the sensors used to determine the configuration data described herein. Because the lid or display chassis of the information handling system 600 may interfere with the transmission and reception functions of any of the antennas 648, 650, 652, 654, 656, 658, the configuration of the information handling system 600 may be considered when deciding which antennas 648, 650, 652, 654, 656, 658 are to be used to create any of the N×N WLAN MIMO array configurations or N×N WWAN MIMO array configurations (e.g., where N=2 or 4). In this embodiment, a plurality of sensors may be operatively coupled to an integrated sensor hub. These sensors may include, among others, a temperature sensor, a pressure sensor, a hall effect sensor, a magnetic sensor, an accelerometer, a magnetometer, a hinge sensor, a light sensor (e.g., ultraviolet light sensor, ambient light sensor), a camera, and a color sensor. Each of these sensors may be used to detect the specific orientation of the information handling system 600 at any time including the location of the information handling system 600 relative to an access point or base station and whether the display chassis (e.g., lid) of the information handling system is in a closed or open position.

In this example scenario (scenario 1, row 3, table 2), the antenna controller may toggle the first DPDT switch and the second DPDT switch to cross over the pair of WWAN high-band MIMO antenna signals to the WLAN antennas and visa versa with the WLAN antenna signals to the WWAN HB MIMO antennas. While doing so, the antenna controller is provided with signal strength data associated with the operation of each of the WWAN high-band (HB) MIMO antennas (e.g., first antenna 648 and second antenna 650) as well as the WLAN antennas (e.g., fifth antenna 656 and sixth antenna 658) in a closed loop fashion. In this embodiment scenario, the antenna controller selects the best 2×2 WLAN MIMO antenna and maps it to the Wi-Fi/Bluetooth front end associated with WLAN data transmissions and receptions. Because the radio signal strength associated with the repurposable WLAN/WWAN diversity antennas (e.g., third antenna 652 and fourth antenna 654) is not as strong as the originally associated WLAN MIMO antennas (e.g., fifth antenna 656 and sixth antenna 658), the antenna controller may leave the original antenna mapping unchanged. It is noted that some antennas may be mapped to operate as transmit/receive antennas (TRx) while others are mapped as antennas that are receiving antennas only (Rx) although they may be either WLAN antennas or WWAN antennas.

The first scenario (row three, table 2), the first antenna 648 and third antenna 652 may operate as dual transmitting antennas during their 5G WWAN operating states. This dual operation of the first antenna 648 and third antenna 652 support E-UTRAN new radio (EN-DC) operations. Additionally, the fifth antenna 656 and the sixth antenna 658 may operate as dual transmit WLAN MIMO antennas. In these embodiments, the antenna controller may continue to monitor the signal strength across all antennas 648, 650, 652, 654, 656, 658 periodically in a closed-loop fashion and may re-assign or re-purpose and map the antennas 648, 650, 652, 654, 656, 658 based on any updated SAR data, RSSI data, system operation and connection metrics, and configuration data as described herein.

Figure 7:
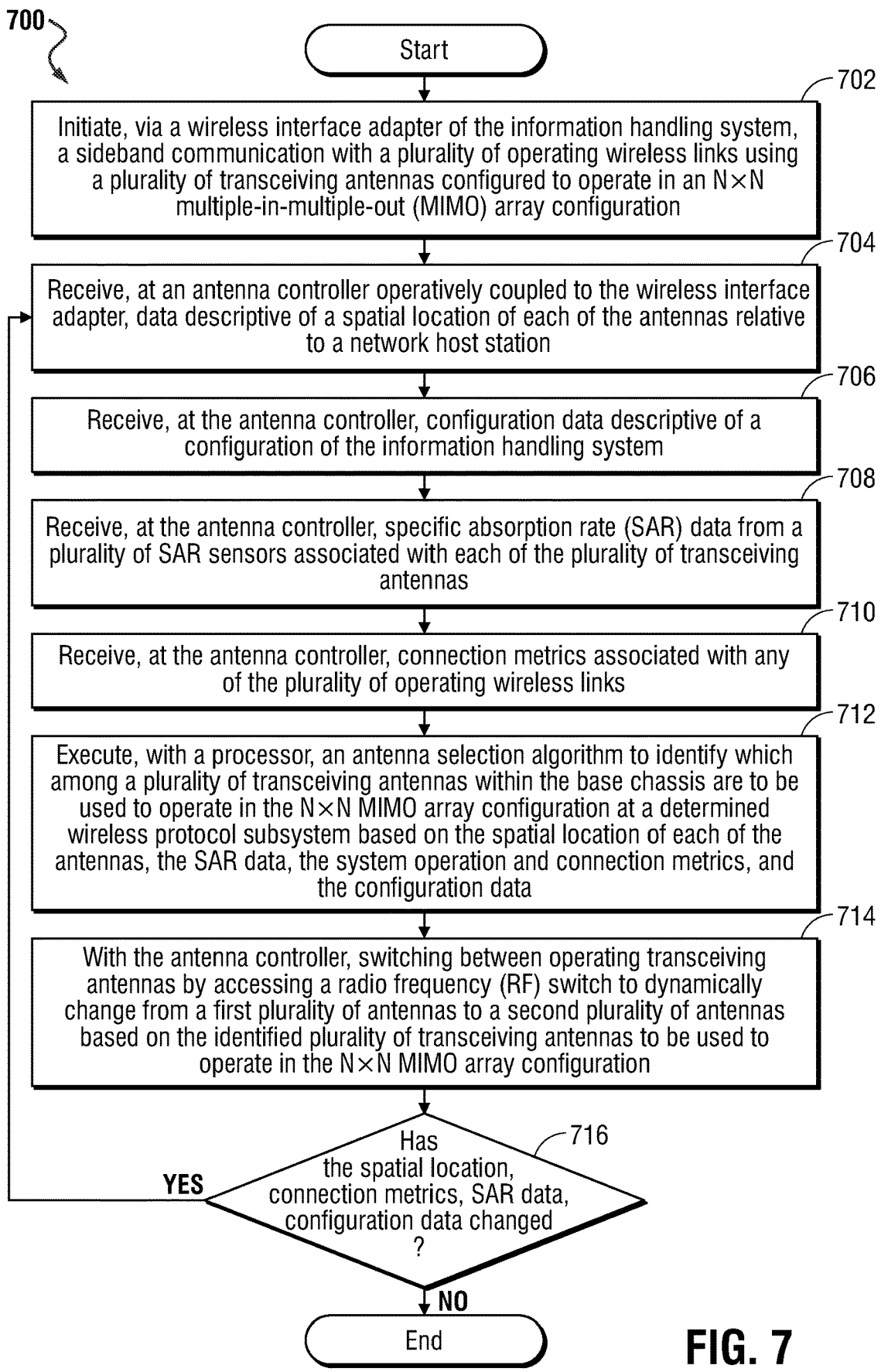
FIG. 7 is a flow diagram illustrating a method of executing a best antenna selection algorithm executed by an information handling system according to an embodiment of the present disclosure.

FIG. 7 is a flow diagram illustrating a method 700 of executing a best antenna selection algorithm executed by an information handling system according to an embodiment of the present disclosure. The method 700 may include, at block 702, initiating, via a wireless interface adapter of the information handling system, a sideband communication with a plurality of operating wireless links using a plurality of transceiving antennas configured to operate in an N×N multiple-in-multiple-out (MIMO) array configuration as well as to establish other wireless links for a plurality of wireless protocols according to the embodiments described herein. As described herein, this sideband communication, when executed by an antenna controller for example, initiates a sideband communication with at least one of the plurality of networks described herein. In an embodiment, the sideband communication may be any wireless communication link with any wireless network apart from a concurrently initiated communication link. In an embodiment, the sideband communication link achieved via execution of the sideband serial messaging protocol may allow the antenna controller to determine which wireless networks and protocols are available to operatively couple the information handling system to a wireless network as well as any system operation and connection metrics associated with those wireless networks. Again, because the system operation and connection metrics includes data descriptive of measured RSSI values and other metrics relating to signal quality and strength of any of each of a plurality of communication networks, the data obtained by the antenna controller may be used during execution of the antenna selection algorithm by an antenna selection controller or processor to determine which wireless network to operatively couple the information handling system to. In an embodiment, the antenna selection algorithm may include computer executable program code that, when executed by the antenna controller, receives these inputs and provides output describing which antennas to use for any number of N×N multiple-in-multiple-out (MIMO) array configuration. Referring to FIG. 5, the antenna controller 540 may receive data from the Wi-Fi/BT front end 525-1 and the cellular front end 525-2, and indirectly via sideband communications, relating to the availability of a wireless protocol and signal levels of antennas at relative locations on the information handling system. This may further include indications from a processor 591 data bandwidth needs and structure of wireless antenna usage necessary to meet such needs to determine MIMO array configurations that may be utilized or priority of wireless protocol to be used.

The method 700 may further include receiving, at an antenna controller operatively coupled to the wireless interface adapter, data descriptive of a spatial location of each of the antennas relative to a network edge device at block 704. In an embodiment such as that described in connection with FIG. 3, the information handling system may include four WLAN antennas. The locations of these antennas within the information handling system (e.g., along a right side of the base chassis, left side of the base chassis, in a hinge of the information handling system, etc.) and their positions relative to a network edge device (e.g., an access point or a base station) may be provided to the antenna controller. Because higher frequencies transmit and receive data at a relatively higher throughput the information handling system may prioritize for those networks and communication protocols that allow for these higher frequencies. However, as the frequency increases, the location of the antennas relative to these network edge devices may affect the ability of the signal to be transmitted between these antennas and the appropriate network edge devices. Referring to FIG. 5, the antenna controller 540 may receive data from the Wi-Fi/BT front end 525-1 and the cellular front end 525-2 relating to the availability of a wireless protocol and directionality of signal levels of antennas for AP or base stations at relative locations on the information handling system.

In an embodiment such as that described in connection with FIG. 5, the information handling system may include six antennas: two WWAN antennas operatively coupled to a cellular front end and four additional antennas selectively couplable to either the cellular front end or a Wi-Fi/Bluetooth front end. Again, the locations of these antennas within the information handling system (e.g., along a right side of the base chassis, left side of the base chassis, in a hinge of the information handling system, etc.) and their positions relative to a network edge device (e.g., an access point or a base station) may be provided to the antenna controller. With this data, the selection of which of these six antennas will be used for any N×N WLAN or WWAN MIMO antenna array configuration may be made.

The method 700 further includes receiving, at the antenna controller, configuration data descriptive of a configuration of the information handling system at block 706. The configuration of the information handling system may be determined by the antenna controller using a number of additional types of sensors. In the context of the information handling system being a 360-degree-type laptop, these sensors may be used to determine if the orientation the information handling system is placed in is one of a tablet configuration, a dual tablet configuration, a laptop configuration, a tent mode configuration, a book configuration, as well as several other configurations described herein. These variety of sensors may include, for example, a hall effect sensor, a magnetometer, a proximity sensor, a hinge sensor, a light sensor, and a camera, among other sensors. Referring to FIG. 5, the antenna controller 540 may execute the antenna selection algorithm and receive integrated sensor hub 596 data relating to orientation of the information handling system as described herein.

In an example embodiment, the hall effect sensor, orientation sensors, or other sensors may be placed at any location within the chassis of the information handling system to detect the position of the individual parts of the information handling system relative to each other. In a specific embodiment where the information handling system is a laptop-type information handling system, the hall effect sensor, orientation sensors, or other sensors may be placed in one or more of a display portion or base portions of the information handling system. In this embodiment, these sensors may detect when the display portion is moved away from a top surface of a based portion, a relative position of the display portion to the base portion, and/or when a back side of the display portion is placed against a bottom portion of the base portion of the information handling system. As described herein, this allows the sensor hub to detect whether the laptop-type information handling system is placed in a tablet configuration, a dual tablet configuration, a laptop configuration, a tent mode configuration, a book configuration, as well as several other configurations described herein. The sensor hub may be similarly used in a dual screen-type information handling system in order to detect the relative positions of each of the screens. Again, any data obtained by the sensor hub is presented to the antenna controller for the antenna controller to interpret and provide that orientation data as input to the antenna selection algorithm as descried herein.

In an example embodiment, a magnetometer may be used to measure the earth's magnetic field at any location in order to detect an orientation of the information handling system relative to that magnetic field. In a specific embodiment, the magnetometer may be a three-axis magnetometer that eliminates the sensitivity to the way in which the information handling system is held or positioned. Again, any data obtained by the magnetometer, such as via a sensor hub, is presented to the antenna controller for the antenna controller to interpret and provide as input to the antenna selection algorithm as described herein.

As this configuration data is provided to the antenna controller at block 706, the antenna controller may determine, for example, whether the lid (e.g., display chassis) is closed or not. Again, because higher frequencies transmit and receive data at a relatively higher throughput, these higher frequencies may be more susceptible to physical barriers blocking the signal and metallic objects interfering with the signals. Because the lid of the information handling system may be made of metal and because it is placed at a relatively closer distance to the antennas when it is closed, this may affect the transmission capabilities of the antennas especially as the transmission and reception frequencies are higher. The antenna controller may take this information into account when assigning the antennas to a specific N×N WLAN or WWAN MIMO antenna array configuration.

The method 700 may continue at block 708 with receiving specific absorption rate (SAR) data from a plurality of SAR sensors associated with each of the plurality of transceiving antennas at block 706. Again, SAR data may be received via operation of a number of SAR proximity sensors located at or near each of the antennas of the antenna systems described herein. In this embodiment, the power levels provided to the antennas of the antenna systems may be compared to the data received by the SAR proximity sensors to determine this SAR safety limitations as well as determine whether, for example, a user's body part is absorbing this RF electromagnetic radiation. Because the presence of a user's body part (e.g., a user's hand) may interfere with the transmission and reception of data, the antenna controller may use this data to determine which of the plurality of antennas should be used to create a N×N WLAN and/or WWAN MIMO array configuration described herein. Referring to FIG. 5, the antenna controller 540 may receive data from the SAR proximity sensor hub 594 relating to the proximity of a user to antennas at relative locations on the information handling system.

The method 700 also includes, at block 710, receiving at the antenna controller, connection metrics (e.g., the system operation and connection metrics) associated with any of the plurality of operating wireless links. The connection metrics may include data such as RSSI data descriptive of a measured received signal strength level, or other signal metrics such as bit error rate, signal to noise ratio, latency, jitter, and other metrics relating to signal quality and strength of any of each of a plurality of communication networks. These connection metrics may be obtained as the antenna controller initiates a sideband serial messaging protocol. The RSSI data, in an embodiment, may be associated with the operation of each of the antennas and may be coordinated with the SAR data received as well. In an embodiment, this RSSI data may be retrieved from, for example, an intermediate-frequency (IF) amplifier used by the wireless interface adapter to raise or lower signal levels at the RF subsystems by increasing or decreasing the power applied to each of the antennas. If and when the RSSI drops, for example, the SAR data may also be cross-referenced to determine whether the drop in transmission is due to the presence of a human body or a drop in power provided to any given antenna. For example, referring to FIG. 5, the antenna controller 540 may receive data from the Wi-Fi/BT front end 525-1 and the cellular front end 525-2, and indirectly via sideband communications, relating to the signal levels of antennas at relative locations on the information handling system.

The method 700 may also include, at block 712, executing, at the antenna controller, an antenna selection algorithm to identify which among a plurality of transceiving antennas within the base chassis are to be used to operate in the N×N MIMO array configuration at a determined wireless protocol subsystem based on the spatial location of each of the antennas, the SAR data, the system operation and connection metrics, and the configuration data. The antenna selection algorithm may be, in an embodiment, any computer executable program code executed by an antenna controller that provides a determination as to which of the antennas are the best to use to form the N×N WLAN and/or WWAN MIMO antenna array configuration. The inputs provided to the antenna controller are defined within the look-up tables described in connection with Tables 1 and 2 herein and those tables provide example outputs that described between which sets of any of the antennas should be selected.

Based on the outputs due to the execution of the antenna selection algorithm by the antenna controller, the antenna controller may adjust the transmissions of each of the antennas within the information handling system. At block 714, the method 700 further includes, with the antenna controller, switching between operating transceiving antennas by accessing a radio frequency (RF) switch to dynamically change from a first plurality of antennas to a second plurality of antennas based on the identified plurality of transceiving antennas to be used to operate in the N×N WLAN and/or WWAN MIMO array configuration. The operations of this switching, in some examples, is depicted in Table 1 and 2. For table 1, the antenna controller may select among four WLAN antennas in order form either a 2×2 WLAN MIMO array configuration, two 2×2 WLAN MIMO array configuration, or a 4×4 WLAN MIMO array configuration based on the output from the antenna controller's execution of the antenna selection algorithm. For table 2, the antenna controller may select among six different antennas in order form either a 2×2 WLAN MIMO array configuration and 4×4 WWAN MIMO array configuration based on the output from the antenna controller's execution of the antenna selection algorithm. With these options, the spatial location of each of the antennas relative to a network edge device may be considered and may affect the ability of any given antenna to transmit and receive data, especially at higher frequencies associated with, for example, 5g protocols and Wi-Fi 6 and 6E protocols. Referring to FIG. 5, the antenna controller 540 may execute the antenna selection algorithm and receive integrated sensor hub 596 data relating to orientation of the information handling system as described and execute determination of which antennas or antenna groups to assign to the cellular front end 525-2 or the Wi-Fi/BT front end 525-1 to establish a MIMO or other wireless link connection to meet the data transmission or reception requirements of the information handling systems. With this determination, the antenna controller 540 may send an instruction signal to any of the DPDT switches 568-1, 568-2, or 568-3 to select the set of antennas to be used for either protocol.

The method 700 may continue at block 716 with determining whether the spatial location of the antennas relative to the network edge devices, connection metrics, SAR data, and configuration data has changed. Because this data is provided to the antenna controller in a closed-loop fashion, the antenna controller may periodically poll this data. Changes to this data may be detected when the antenna controller detects a drop in data throughput to and from the information handling system. This may cause the antenna controller to again pull the configuration data, SAR data, connection metrics, and spatial location data at blocks 704 through 710, executing the antenna selection algorithm at block 712, and, when necessary, reassigning any of the plurality of antennas to be included within those antennas forming the N×N WLAN and/or WWAN MIMO array configurations. Where this data is stable at block 716 and when the information handling system may power down or the wireless system cease to be used, the method 700 may end. Otherwise the information handling system may continue to monitor for selection among switched antennas depending on changes in the configuration, proximity, application data needs, location/orientation, or other factors as discussed in some embodiments.

The blocks of the flow diagrams of FIG. 7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a processor;
    a memory;
    a power management unit (PMU);
    a wireless interface adapter for communicating, via a plurality of transceiving antennas operated by one or more radio frequency (RF) subsystems, a plurality of operating wireless links, wherein the plurality of transceiving antennas operate in a multiple-in-multiple-out (MIMO) array configuration;
    an antenna controller to receive:
        specific absorption rate (SAR) data from a plurality of SAR sensors;
        system operation and connection metrics from one or more wireless networks via a sideband serial messaging protocol;
        a signal strength indicator (RSSI) data from a wireless protocol front end device; and
        configuration data descriptive of a configuration of the information handling system from a sensor hub;
    the antenna controller to execute an antenna selection algorithm accessing data descriptive of a spatial location of each of the plurality of transceiving antennas relative to a network edge device to identify which among the plurality of transceiving antennas within a base chassis are to be used to operate in the MIMO array configuration at a determined wireless protocol subsystem based on the spatial location of each of the plurality of transceiving antennas, the SAR data, the system operation and connection metrics, and the configuration data; and
    the antenna controller to switch between operating among the plurality of transceiving antennas by accessing a radio frequency (RF) switch to dynamically change from a first plurality of antennas to a second plurality of antennas based on the identified plurality of transceiving antennas to be used to operate in the MIMO array configuration.

2. The information handling system of claim 1 further comprising:
    the RF switch the antenna controller to signal an RF switch to selectively switch from a first transceiving antenna to a second transceiving antenna.

3. The information handling system of claim 1 further comprising:
    the antenna controller to signal the RF switch including two double pole, double throw (DPDT) switches to selectively switch from a first set of two transceiving antennas to a second set of two transceiving antennas.

4. The information handling system of claim 1 further comprising:
    the RF switch to switch from a first set of transceiving antennas to a second set of transceiving antennas per the plurality of transceiving antennas identified to be used to operate in the MIMO array configuration by the antenna controller wherein the first set of transceiving antennas includes at least one wireless local area network (WLAN) antenna and the second set of transceiving antennas includes the switching from the at least one WLAN antenna to at least one wireless wide area network (WWAN).

5. The information handling system of claim 1 further comprising:
    the antenna selection algorithm includes a look-up table to be used to cross-reference the data descriptive of the spatial location of each of the plurality of transceiving antennas relative to inputs including the SAR data from the plurality of SAR sensors, the system operation and connection metrics, and configuration data; and
    to provide, as output, an identification of which among the plurality of transceiving antennas are to be used to operate in the MIMO array configuration.

6. The information handling system of claim 1 further comprising:
    the sideband serial messaging protocol including an excitation of one of the plurality of transceiving antennas at one of the plurality of operating wireless links to determine wireless connection metrics across a plurality of wireless connections available to the information handling system.

7. The information handling system of claim 1 further comprising:
    the plurality of transceiving antennas including a pair of wireless local area network (WLAN) antennas and a pair of wireless wide area network (WWAN) antennas, and
    wherein at least one of the pair of WLAN antennas is operatively switched to operate as a WWAN antenna, or
    wherein at least one of the pair of WWAN antennas is operatively switched to operate as a WLAN antenna.

8. A method implemented at an information handling system comprising:
    initiating, via a wireless interface adapter of the information handling system, a sideband communication with a plurality of operating wireless links using a plurality of transceiving antennas configured to operate in a multiple-in-multiple-out (MIMO) array configuration;

receiving at an antenna controller operatively coupled to the wireless interface adapter:
- data descriptive of a spatial location of each of the plurality of transceiving antennas relative to a network edge device;
- connection metrics associated with any of the plurality of operating wireless links;
- specific absorption rate (SAR) data from a plurality of SAR sensors associated with each of the plurality of transceiving antennas; and
- configuration data descriptive of a configuration of the information handling system from a sensor hub;

executing, with a processor, an antenna selection algorithm to identify which among the plurality of transceiving antennas within a base chassis are to be used to operate in the MIMO array configuration at a determined wireless protocol subsystem based on the spatial location of each of the plurality of transceiving antennas, the SAR data, a system operation and connection metrics, and the configuration data; and with the antenna controller, switching between operating transceiving antennas by accessing a radio frequency (RF) switch to dynamically change from a first plurality of antennas to a second plurality of antennas based on the identified plurality of transceiving antennas to be used to operate in the MIMO array configuration.

9. The method implemented at the information handling system of claim 8 further comprising:
signaling the RF switch including a single pole, single throw (SP2T) switch to selectively switch from a first transceiving antennas to a second transceiving antenna.

10. The method implemented at the information handling system of claim 8 further comprising:
signaling the RF switch including two double pole, double throw (DPDT) switches to selectively switch from a first set of two transceiving antennas to a second set of two transceiving antennas.

11. The method implemented at the information handling system of claim 8 further comprising:
switching, with the RF switch, from a first set of transceiving antennas to a second set of transceiving antennas per the plurality of transceiving antennas identified to be used to operate in the MIMO array configuration by the antenna controller wherein the first set of transceiving antennas includes at least one wireless local area network (WLAN) antenna and the second set of transceiving antennas includes the switching from the at least one wireless local area network (WLAN) antenna to at least one wireless wide area network (WWAN).

12. The method implemented at the information handling system of claim 8 further comprising:
determining with the antenna selection algorithm via a look-up table with the execution of the antenna controller, selection of spatially located antennas on the information handling system based on inputs including the SAR data from the plurality of SAR sensors, the system operation and connection metrics, and configuration data; and
sending to the antenna controller, as output, an identification of which among the plurality of transceiving antennas are to be used to operate in the MIMO array configuration.

13. The method implemented at the information handling system of claim 8 further comprising:
exciting of one of the plurality of transceiving antennas at one of the plurality of operating wireless links to execute the sideband communication via a sideband serial messaging protocol to determine wireless connection metrics across a plurality of wireless connections available to the information handling system.

14. The method implemented at the information handling system of claim 8 further comprising:
signaling, via the antenna controller, to operatively switch at least one of a pair of wireless local area network (WLAN) antennas to operate as wireless wide area network (WWAN) antenna among the plurality of transceiving antennas, or to operatively switch at least one of a pair of WWAN antennas to operate as a WLAN antenna.

15. A wireless interface adapter for an information handling system comprising:
a plurality of transceiving antennas to communicate over a plurality of operating wireless links, wherein the plurality of transceiving antennas operate in an multiple-in-multiple-out (MIMO) array configuration;
an antenna controller to receive:
- specific absorption rate (SAR) data from a plurality of SAR sensors;
- system operation and connection metrics from a sideband serial messaging protocol;
- configuration data descriptive of a configuration of the information handling system from a sensor hub; and the antenna controller to execute an antenna selection algorithm to identify which among the plurality of transceiving antennas within a base chassis are to be used to operate in the MIMO array configuration at a determined wireless protocol subsystem based on a spatial location of each of the plurality of transceiving antennas, the SAR data, the system operation and connection metrics, and the configuration data; and the antenna controller to switch between operating transceiving antennas by accessing a radio frequency (RF) switch to dynamically change from a first plurality of antennas to a second plurality of antennas based on the identified plurality of transceiving antennas to be used to operate in the MIMO array configuration;

the plurality of transceiving antennas including a pair of wireless local area network (WLAN) antennas and a pair of wireless wide area network (WWAN) antennas; and wherein at least one of the pair of WLAN antennas is operatively switched and repurposed to operate as a WWAN antenna.

16. The wireless interface adapter of claim 15 further comprising:
a radiofrequency (RF) switch including two double pole, double throw (DPDT) switches to selectively switch from a first set of two transceiving antennas to a second set of two transceiving antennas.

17. The wireless interface adapter of claim 15 further comprising:
the RF switch including a plurality of DPDT switches that select among two WWAN antennas operatively couplable to a cellular front end to, when switched, cause the two WWAN antennas to be repurposed to operate as WLAN antenna in a 4×4 MIMO array configuration.

18. The wireless interface adapter of claim 15 further comprising:
the antenna selection algorithm to provide, as output, an identification of which among the plurality of transceiving antennas are to be used to operate in the MIMO array configuration for one of a WWAN front end transception or a WLAN transception.

19. The wireless interface adapter of claim 15, further comprising:
the sideband serial messaging protocol including an excitation of one of the plurality of transceiving antennas at one of the plurality of operating wireless links to determine wireless connection metrics across a plurality of wireless connections available to the information handling system.

20. The wireless interface adapter of claim 15, further comprising:
four WWAN antennas operatively coupled to a cellular front end where two of the four WWAN antennas are also operatively coupled to the cellular front end;
two WLAN antennas operatively coupled to a WLAN front end; and
the antenna controller to actuate the RF switches based on the data descriptive of the spatial location of each of the antennas, the SAR data from the plurality of SAR sensors, the system operation and connection metrics, and configuration data, to dynamically switch the two WWAN antennas to be operatively coupled to the Wi-Fi front end.

* * * * *